United States Patent
Bleizeffer et al.

(10) Patent No.: US 7,028,043 B2
(45) Date of Patent: Apr. 11, 2006

(54) CREATION OF CUSTOMIZED TREES

(75) Inventors: Terry Michael Bleizeffer, Santa Cruz, CA (US); Allan Eugene Gillespie, Danville, CA (US); Eileen Felicia Kopp, Gilroy, CA (US); Tony Kai-chi Leung, San Jose, CA (US); Stan Wong, San Jose, CA (US)

(73) Assignee: International Business Machines Corporation, Armonk, NY (US)

( * ) Notice: Subject to any disclaimer, the term of this patent is extended or adjusted under 35 U.S.C. 154(b) by 535 days.

(21) Appl. No.: 09/248,736

(22) Filed: Feb. 11, 1999

(65) Prior Publication Data

US 2003/0033267 A1 Feb. 13, 2003

Related U.S. Application Data

(60) Provisional application No. 60/081,397, filed on Apr. 10, 1998.

(51) Int. Cl.
*G06F 17/30* (2006.01)

(52) U.S. Cl. .............................. 707/102; 707/3; 707/9; 707/101; 707/103 R

(58) Field of Classification Search ................ 707/102, 707/3, 100, 101, 103 R, 107, 9
See application file for complete search history.

(56) References Cited

U.S. PATENT DOCUMENTS

| | | | |
|---|---|---|---|
| 5,408,654 A | | 4/1995 | Barry |
| 5,414,809 A | * | 5/1995 | Hogan et al. ............... 345/440 |
| 5,455,945 A | | 10/1995 | VanderDrift |
| 5,493,678 A | * | 2/1996 | Arcuri et al. ................... 707/1 |
| 5,522,068 A | | 5/1996 | Berkowitz |
| 5,559,692 A | | 9/1996 | Telingator et al. |
| 5,574,910 A | | 11/1996 | Bialkowski et al. |
| 5,596,747 A | | 1/1997 | Katabami et al. |
| 5,701,137 A | * | 12/1997 | Kiernan et al. ............. 345/340 |
| 5,721,915 A | | 2/1998 | Sockut et al. |
| 5,787,409 A | | 7/1998 | Seiffert et al. |
| 5,842,218 A | * | 11/1998 | Robinson ..................... 707/102 |
| 5,912,664 A | * | 6/1999 | Eick et al. ................... 345/327 |
| 5,956,715 A | * | 9/1999 | Glasser et al. ................. 707/9 |
| 6,002,865 A | * | 12/1999 | Thomsen ....................... 707/3 |
| 6,003,040 A | * | 12/1999 | Mital et al. ................. 707/103 |

(Continued)

FOREIGN PATENT DOCUMENTS

JP 06-67950 3/1994

(Continued)

OTHER PUBLICATIONS

Atzeni, P. et al., "Semistructured and Structured Data in the Web: Going Back and Forth", *SIGMOD*, vol. 26, No. 4, pp. 16-23, Dec. 1997.

*Primary Examiner*—Mohammad Ali
*Assistant Examiner*—Khanh Pham
(74) *Attorney, Agent, or Firm*—Gates & Cooper LLP

(57) ABSTRACT

A method, apparatus, and article of manufacture for computer-implemented creation of customized tree. A customized tree is created in a computer from an original tree. The original tree contains objects from a data storage device connected to the computer. One or more objects are selected from the original tree to be contained in the customized tree in response to user input. The selected objects are linked in a user-specified manner.

102 Claims, 20 Drawing Sheets

U.S. PATENT DOCUMENTS

| | | | |
|---|---|---|---|
| 6,005,571 A * | 12/1999 | Pachauri | 345/764 |
| 6,028,602 A * | 2/2000 | Weidenfeller et al. | 345/781 |
| 6,072,490 A * | 6/2000 | Bates et al. | 345/347 |
| 6,078,924 A * | 6/2000 | Ainsbury et al. | 707/101 |
| 6,119,122 A * | 9/2000 | Bunnell | 707/102 |
| 6,133,914 A * | 10/2000 | Rogers et al. | 345/334 |
| 6,198,480 B1 * | 3/2001 | Cotugno et al. | 345/866 |
| 6,341,280 B1 * | 1/2002 | Glass et al. | 707/10 |

FOREIGN PATENT DOCUMENTS

| | | |
|---|---|---|
| JP | 07-64748 | 3/1995 |
| JP | 07-152615 A | 6/1995 |
| JP | 08-202597 | 8/1996 |
| JP | 09-034758 | 2/1997 |
| JP | 09-305360 | 11/1997 |

* cited by examiner

CREATION OF CUSTOMIZED TREES

PROVISIONAL APPLICATION

This application claims the benefit of U.S. Provisional Application No. 60/081,397, entitled "CREATION OF CUSTOMIZED TREES," filed on Apr. 10, 1998, by Terry M. Bleizeffer et al., which is incorporated by reference herein.

BACKGROUND OF THE INVENTION

1. Field of the Invention

This invention relates in general to computer-implemented systems, and, in particular, to creation of customized trees.

2. Description of Related Art

In conventional systems, a file system may be represented with a tree. A tree is a hierarchical structure that shows the relationship of one object to another. Each object is represented as a node in the tree. For example, a folder object may "contain" (i.e., enclose) one or more folder objects, which contain one or more document objects. A user can access each object that is contained within another object by "drilling down" to that object. For example, to access a particular document object, the user first accesses the appropriate folder object that contains the document object.

However, in conventional systems, some of the objects in a tree are infrequently, or never, used by some users. In this case, the users may prefer not to see these particular objects. Instead, users may prefer to work with a small subset of the objects, rather than the entire tree. Additionally, in conventional systems, objects may not be ordered as a user desires. A user may wish to perform similar operations on several objects at the same time. The objects may, however, be located in disparate places across different branches of the tree. There is no convenient mechanism for conveniently viewing an arbitrary set of objects and operating on some or all of them while they are being viewed.

There is a need in the art for improved trees.

SUMMARY OF A PREFERRED EMBODIMENT OF THE DISCLOSURE

To overcome the limitations in the prior art described above, and to overcome other limitations that will become apparent upon reading and understanding the present specification, an embodiment of the present invention discloses a method, apparatus, and article of manufacture for computer-implemented creation of customized trees.

In accordance with the present invention, a customized tree is created in a computer from a original tree. The original tree contains objects from a data storage device connected to the computer. One or more objects are selected from the original tree to be contained in the customized tree in response to user input. The selected objects are linked in a user-specified manner.

BRIEF DESCRIPTION OF THE DRAWINGS

Referring now to the drawings in which like reference numbers represent corresponding parts throughout.

DETAILED DESCRIPTION OF A PREFERRED EMBODIMENT

In the following description of a preferred embodiment, reference is made to the accompanying drawings which form a part hereof, and which is shown by way of illustration a specific embodiment in which the invention may be practiced. It is to be understood that other embodiments may be utilized as structural changes may be made without departing from the scope of the present invention.

Hardware Environment

Figure 1:
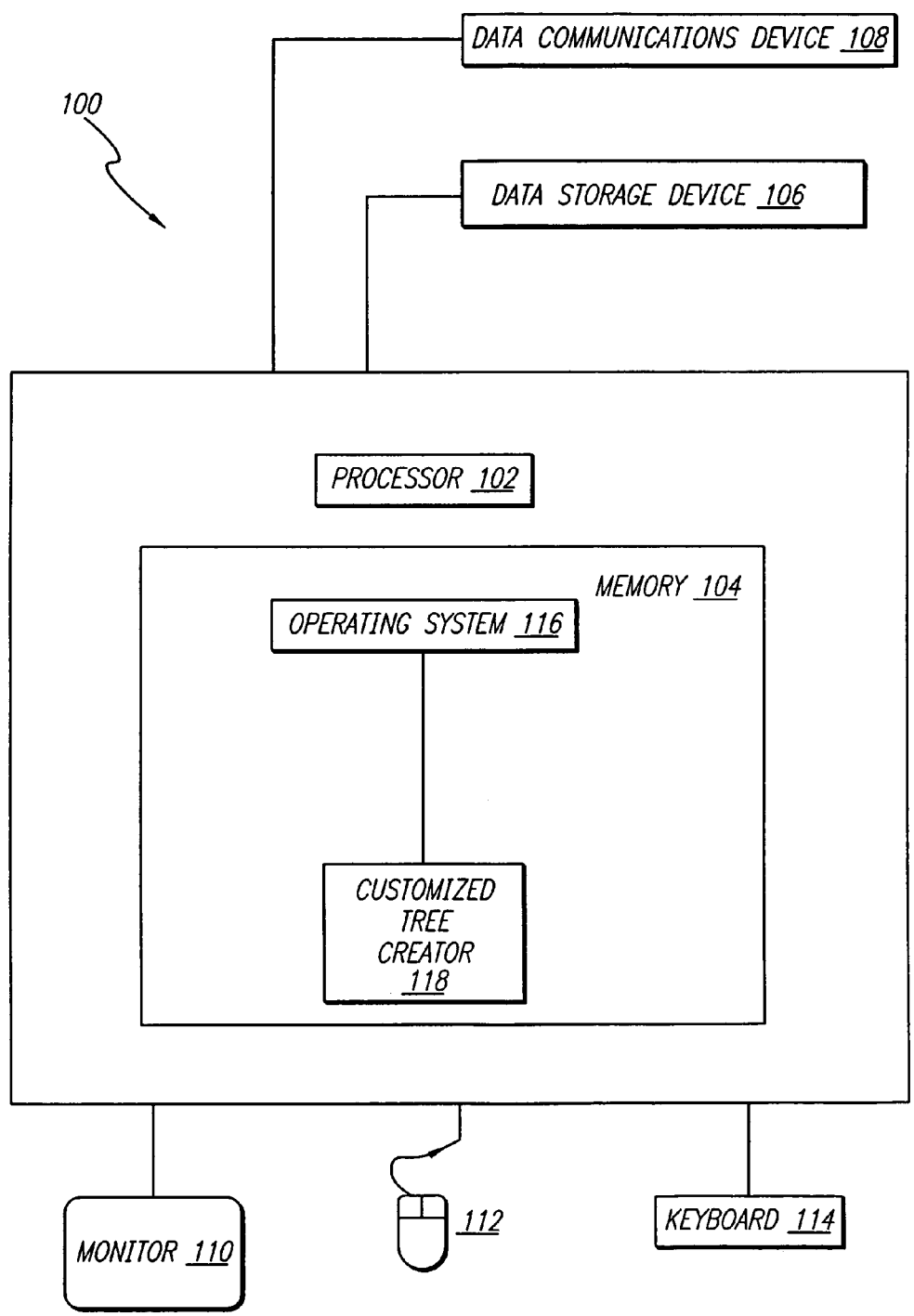
FIG. 1 illustrates an exemplary computer hardware environment that could be used in accordance with an embodiment of the present invention.

FIG. 1 is an exemplary hardware environment used to implement the preferred embodiment of the invention. The present invention is typically implemented using a computer 100, which generally includes, inter alia, a processor 102, random access memory (RAM) 104, data storage devices 106 (e.g., hard, floppy, and/or CD-ROM disk drives, etc.), data communications devices 108 (e.g., modems, network interfaces, etc.), monitor 110 (e.g., CRT, LCD display, etc.), mouse pointing device 112 and keyboard 114. It is envisioned that attached to the computer 100 may be other devices such as read only memory (ROM), a video card, bus interface, printers, etc. Those skilled in the art will recognize that any combination of the above components, or any number of different components, peripherals, and other devices, may be used with the computer 100.

The computer 100 operates under the control of an operating system (OS) 116, such as AIX™, OS/2™, WINDOWS NT™, WINDOWS™, UNIX™, etc. The operating system 116 is booted into the memory 102 of the computer 100 for execution when the computer 100 is powered-on or reset. In turn, the operating system 116 then controls the execution of one or more computer programs 118 by the computer 100. The present invention is generally implemented in these computer programs 118, which execute under the control of the operating system 116 and cause the computer 100 to perform the desired functions as described herein.

The operating system 116 and computer programs 118 are comprised of instructions which, when read and executed by the computer 100, causes the computer 100 to perform the steps necessary to implement and/or use the present invention. Generally, the operating system 116 and/or computer programs 118 are tangibly embodied in and/or readable from a device, carrier, or media, such as memory 102, data storage devices 106, and/or a remote device coupled to the computer 100 via the data communications devices 108. Under control of the operating system 116, the computer programs 118 may be loaded from the memory 102, data storage devices 106, and/or remote devices into the memory 102 of the computer 100 for use during actual operations.

Thus, the present invention may be implemented as a method, apparatus, or article of manufacture using standard programming and/or engineering techniques to produce software, firmware, hardware, or any combination thereof. The term "article of manufacture" (or alternatively, "computer program product") as used herein is intended to encompass a computer program accessible from any computer-readable device, carrier, or media. Of course, those skilled in the art will recognize many modifications may be made to this configuration without departing from the scope of the present invention.

Those skilled in the art will recognize that the exemplary environment illustrated in FIG. 1 is not intended to limit the present invention. Indeed, those skilled in the art will recognize that other alternative hardware environments may be used without departing from the scope of the present invention. The Creation of Customized Trees In one embodiment, the present invention provides a customized tree creator 118 for creating a customized tree. The customized tree creator 118 works in conjunction with a tree-based application ("parent application") that represents objects with a tree. In one embodiment of the invention, the customized tree creator 118 adds functionality to the parent application by enabling a user to create a customized tree based on a tree provided by the parent application. One skilled in the art would recognize that although the discussion herein illustrates the customized tree creator 118 working in conjunction with a parent application, the customized tree creator 118 is not necessarily, but may be, separate from the parent application.

The customized tree is typically generated from one or more other trees ("original trees"), which may be system generated trees or customized trees. The objects in the trees may represent a database management system and its objects, such as tables and indexes. However, one skilled in the art would recognize that the principles of the present invention can be applied to any type of object. The customized tree creator 118 enables users to create a customized tree that includes objects from multiple databases. Additionally, the customized tree creator 118 enables users to create a customized tree to group together a subset of the objects in a customized tree that the users wish to work with.

Moreover, the customized tree creator 118 enables users to modify the order of objects in the customized tree. Therefore, a customized tree can be created with a subset of objects, including objects from different databases, with the objects ordered as desired by the user. The customized tree can be stored and used again, modified again, etc. Additionally, the customized tree creator 118 enables users to organize and locate data. Furthermore, the customized tree creator 118 enables users to create a customized tree starting with any object in an original tree.

The customized tree creator 118 is particularly advantageous in that it enables a user to build a folder that contains objects, such as tables, from multiple databases. Once a folder has been created containing, for example, tables from two or three databases, when a user wishes to work with these tables, the user can access the tables using their corresponding nodes on the customized tree. On the other hand, in conventional systems, there may be multiple databases (e.g., database1 and database2) each with folders containing tables. In conventional systems, users are unable to see all tables created across these two databases at the same time. Instead, in conventional systems, a user may be constrained to view each leaf node corresponding to a table separately.

The customized tree creator 118 is further advantageous in that, in a customized tree, the presentation of objects may be modified by the user. The customized tree creator 118 allows users to control presentation to suit their purpose, for example, for a particular view of a database. Users can order the objects of a database in a customized tree according to their data and what they want to manage. In one embodiment, there are no predefined limitations on the ordering. In another embodiment, there are some predefined limitations on the ordering, for example, preventing a table object from containing a database object. On the other hand, in conventional systems, programmers, rather than users, often determine the presentation of objects.

Typically, a tree is a hierarchical structure that shows the relationship of one object to another. For example, a database object may be enclosed by another database object, and table objects may be enclosed by a database object. However, the tree structure may not be strictly hierarchical, but, instead, may show one object enclosing another, enabling the drilling down to objects enclosed in other objects.

A customized tree can be used, in one embodiment, to provide a visual representation of a database. A user can select an object in the customized tree, for example, using a mouse to point at the object and clicking the mouse button. If a user selects an object in the customized tree, a pop-up is displayed that lets a user select an action to perform on the selected object. Actions for a customized tree include, for example, opening a customized tree, creating a customized tree, changing a customized tree, or removing part or all of a customized tree.

To remove a folder from a tree, a user can select one or more folder objects on the tree and choose the "Remove" action from the pop-up. A confirmation window appears asking the user if the user would like to remove the folder or folders selected. When the user confirms the remove action, the selected folder or folders are removed from the window displaying the tree. The changes then may be saved using, for example, a "Save" action (e.g., a Save action that would save the customized tree object to a file). An existing customized tree may be removed, For example, a user may use an operating system file system to locate a file containing the customized tree and delete the file. However, one skilled in the art would recognize that a user need not save the changes or could save the changes in a different manner and could remove the customized tree in a different manner.

Additionally, the customized tree creator 118 enables users to apply one or more actions against a folder object. That is, group actions may be applied to a folder object. For example, if a database node contained employee tables, then "dropping" the database object would "DROP" each of the employee tables contained in the database object. Similarly, other actions could be taken, such as changing privileges for a group of objects, replicating objects, defining user access, performing backups, or invoking other utility mechanisms.

Individual object actions can be applied to all of the contents of a folder object by choosing that action from the pop-up when a folder object is selected. For example, a user could choose a "Run Statistics" action after selecting a Tables folder object, and the "Run Statistics" action would be performed against all the tables in the Table folder. The user would not have to specify the individual tables. All of the specific actions for an individual table could also be available on the Table folder object. The same would be true for the other folder objects in the tree.

Customized trees would be beneficial to many users. For example, a senior database administrator who distributes work to junior database administrators may want to provide each junior database administrator with a separate customized tree, each with a particular group of objects that are relevant to the work of the junior database administrator. In this way, customized trees can be used to compartmentalize the objects to which people have access. Additionally, customized trees provide convenience. For example, database administrators can provide customized trees to application programmers that include folders for databases needed by the application programmers, without including databases containing sensitive information (e.g., payroll tables).

In one embodiment of the invention, the Data Joiner product from IBM could be used to show databases from different platforms, for example, databases from Oracle or Sybase. With the ability to view databases from different platforms, a user is able to use the customized tree creator 118 to create a tree containing objects from the databases, from different platforms, that the user wishes to work with. Conventional systems do not provide the ability to group objects from databases across different platforms and view them together.

In one embodiment of the invention, the customized tree creator 118 enables any user to modify a customized tree. The databases typically have some security mechanisms (e.g., user identification checking), so that even if access to a customized tree is not restricted, a user may not be able to access particular databases because of that user's restricted access to those databases. In another embodiment of the invention, the customized tree creator 118 takes security measures to prevent modification of customized trees by one or more specified users. In particular, in a conventional system, a catalog which contains information about a database (e.g., tables, indexes, etc.) is used to set security restrictions. However, the customized tree creator 118 enables a user to define the security restrictions using the tree itself.

FIGS. 2–16 will be used to provide an example of customizing a tree. The customized tree creator 118 provides a series of graphical user interfaces to enable a user to easily customize a tree. The customized tree creator 118 creates, modifies, opens, etc. a tree in response to user input received from the graphical user interfaces.

Figure 2:
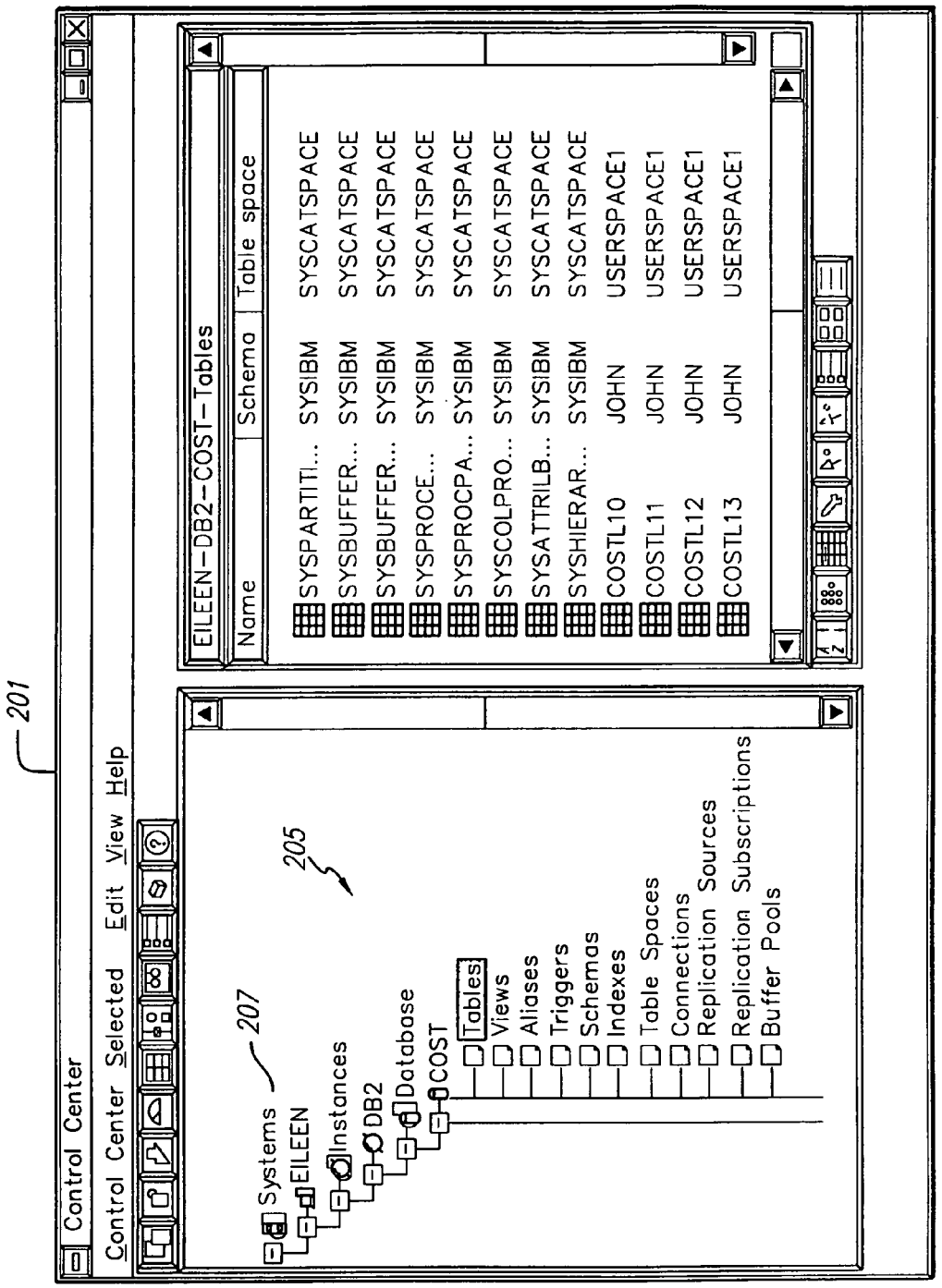
FIG. 2 is an illustration of a tree based application within a window.
Figure 3:
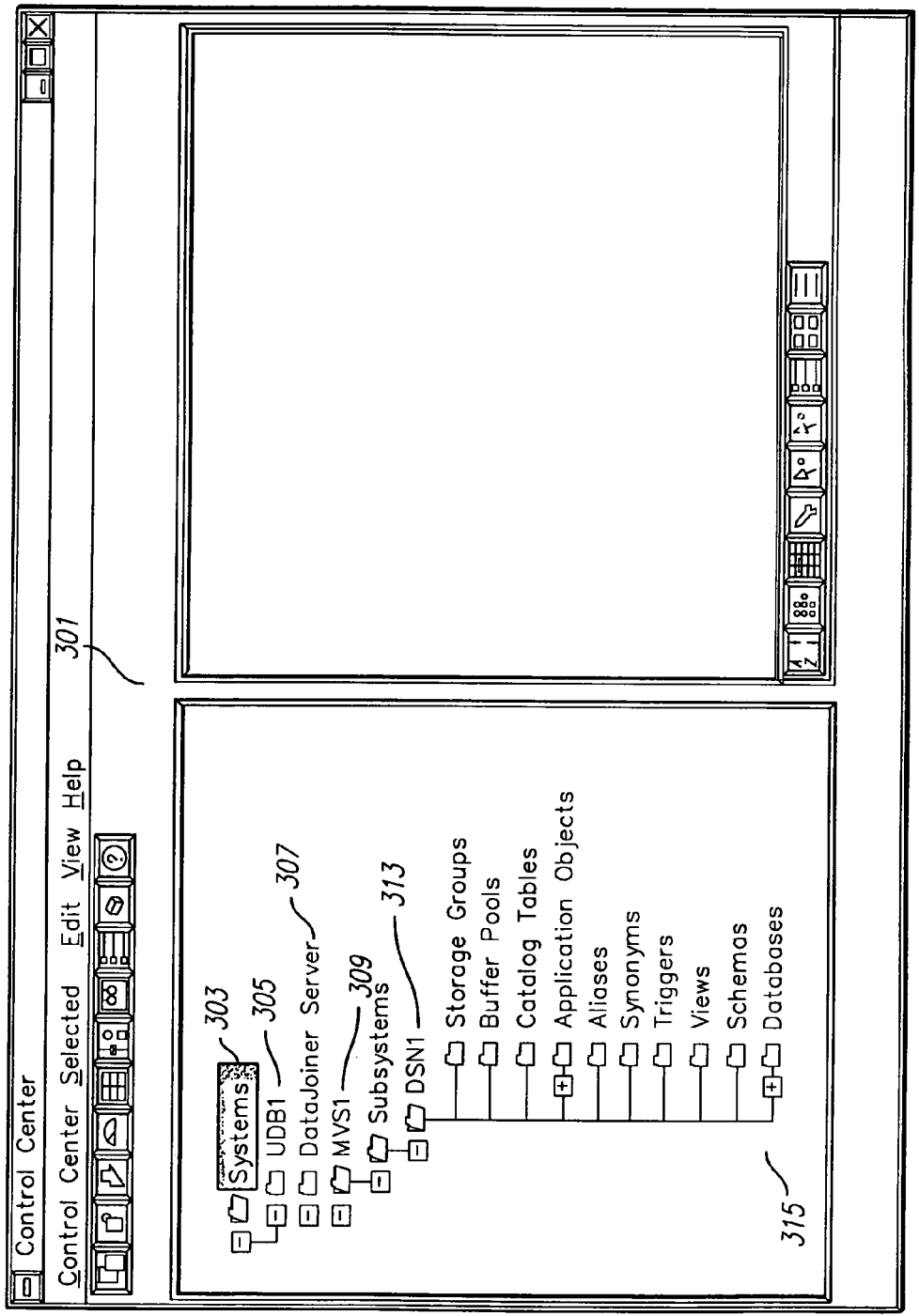
FIG. 3 is an illustration of a tree with branches and multiple objects.
Figure 4:
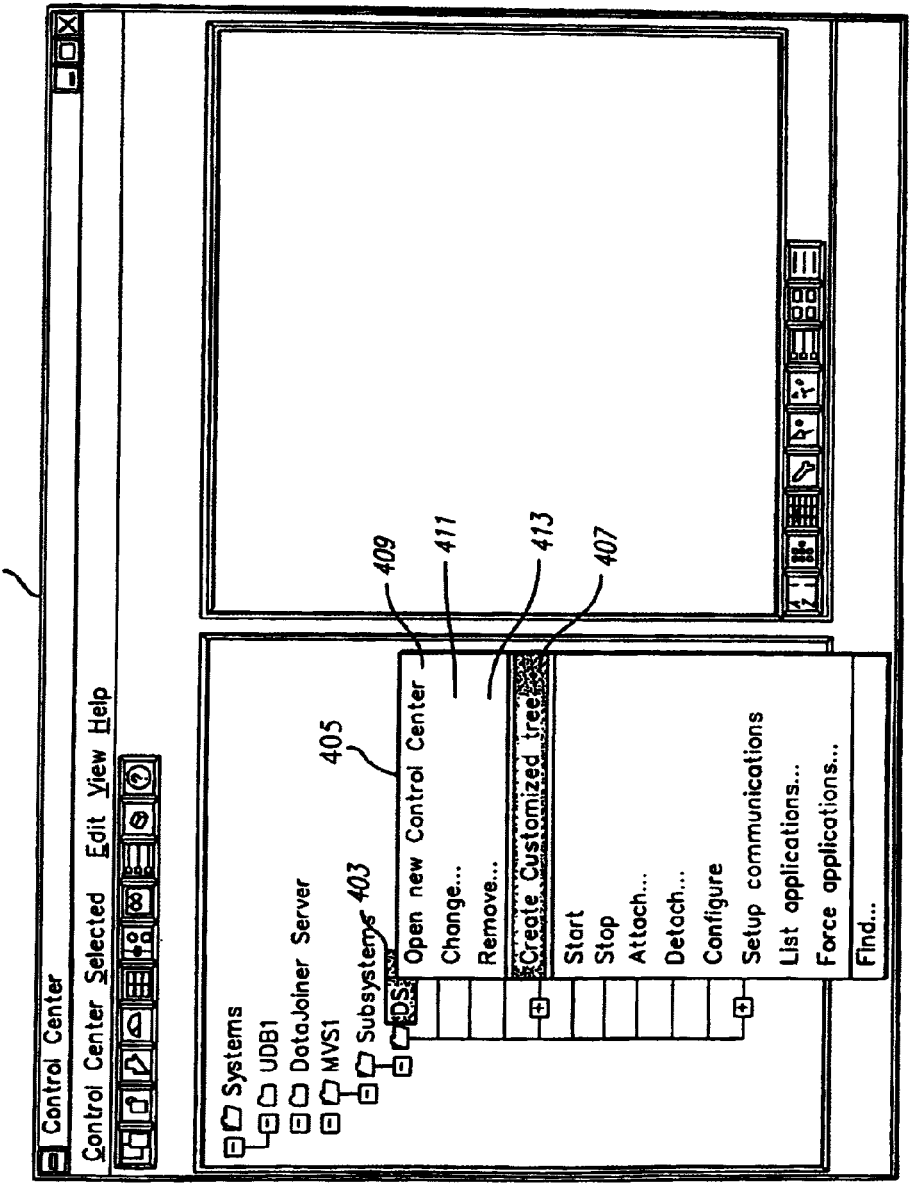
FIG. 4 illustrates the tree illustrated in FIG. 3 with a pop-up that enables a user to create a customized tree.
Figure 5:
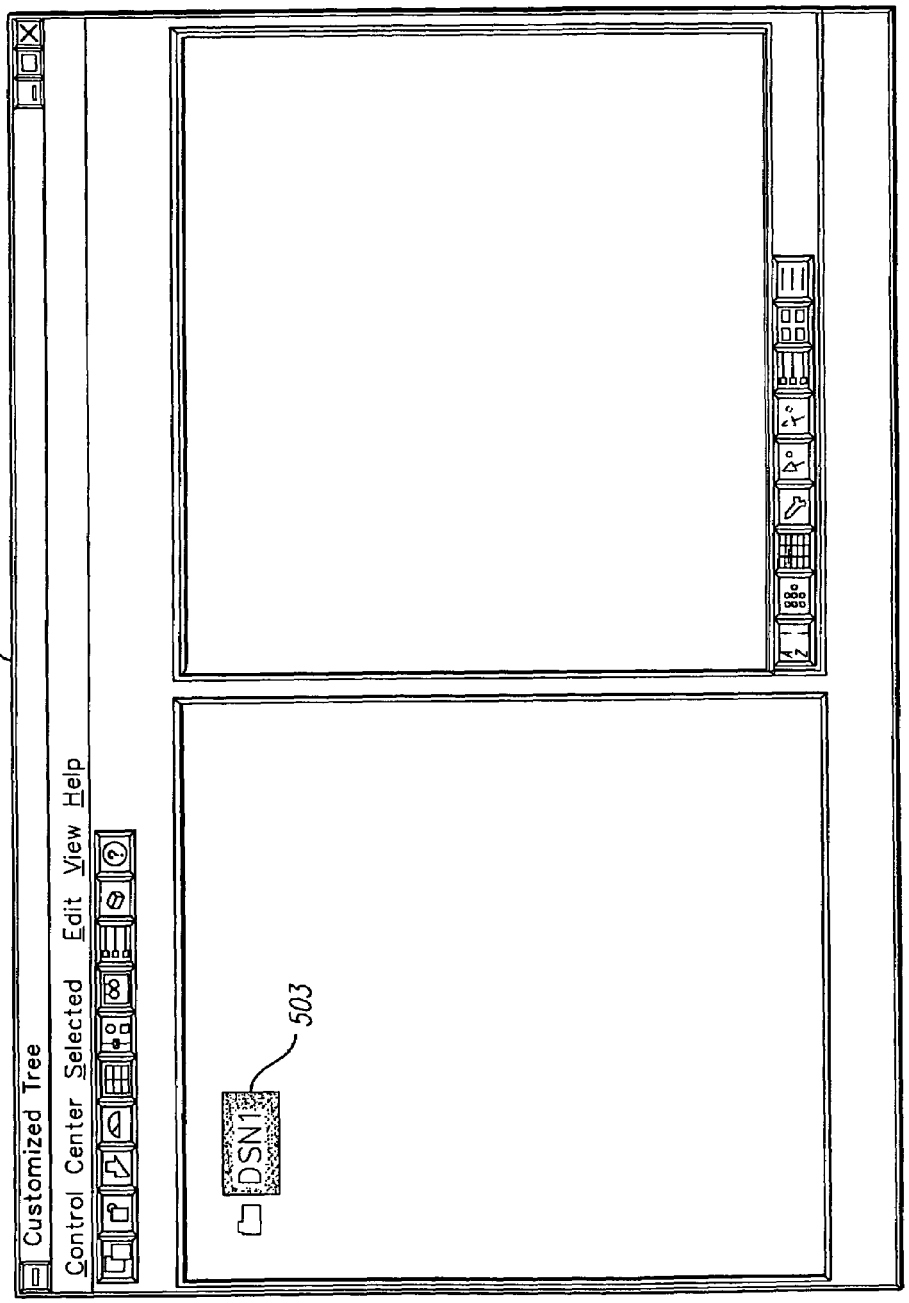
FIG. 5 illustrates a window displayed after a "Create customized tree . . . " action is selected.
Figure 6:
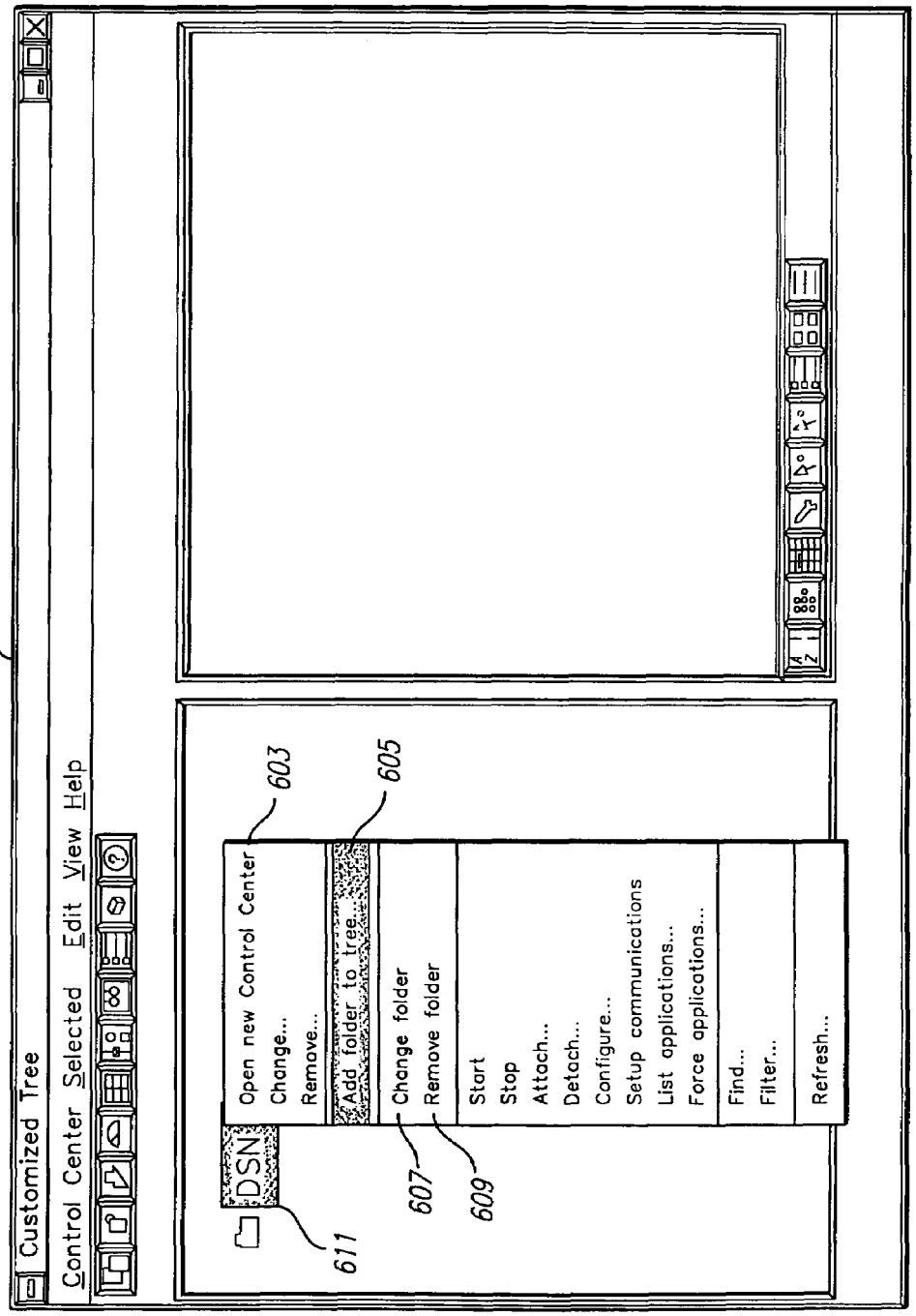
FIG. 6 illustrates adding a database object to a customized tree.
Figure 7:
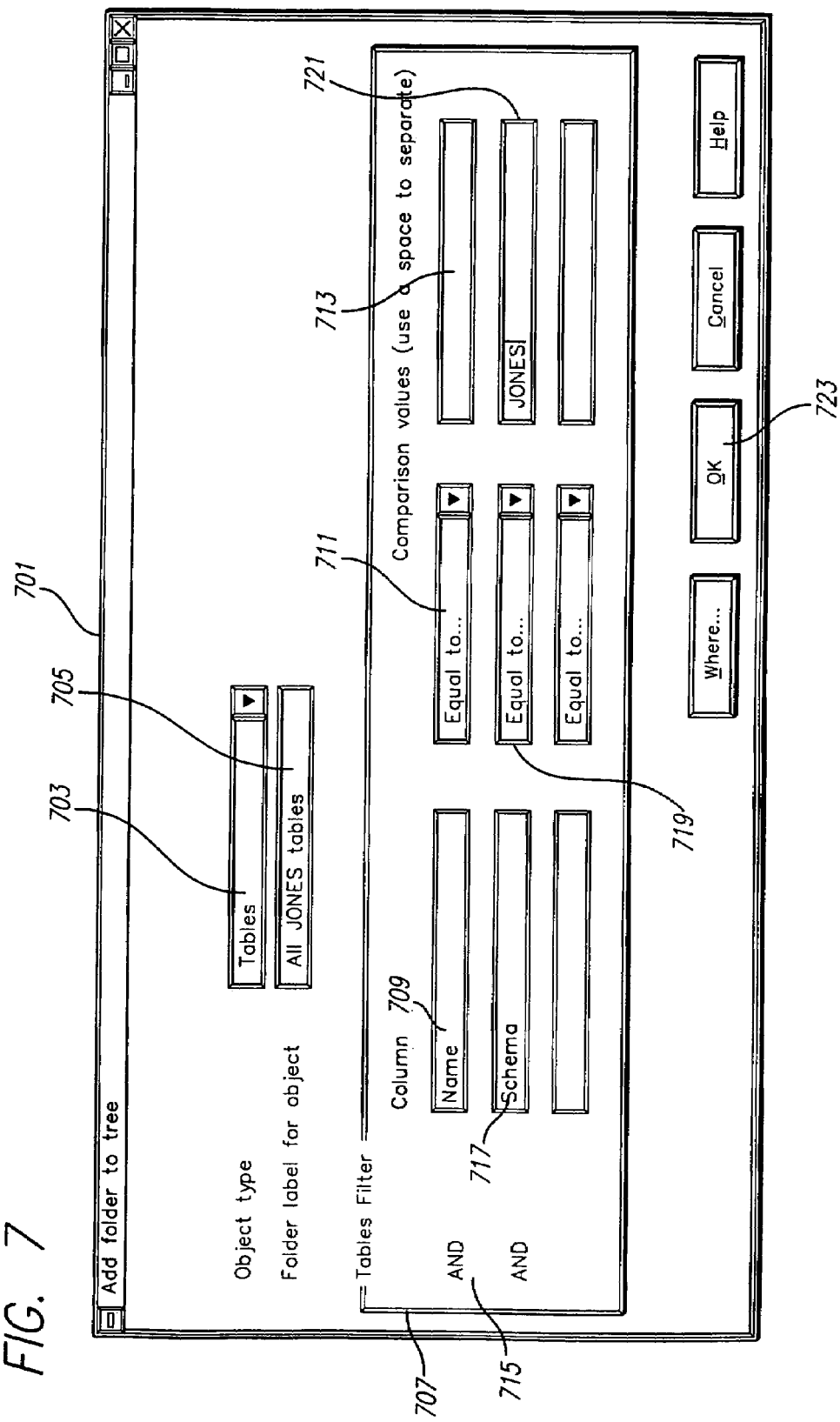
FIG. 7 illustrates an Add Folder to Tree window that is displayed in response to selection of the "Add folder to tree" action.

The embodiment of the disclosure presented below illustrates an example of how the customized tree creator 118 may be utilized to produce a customized tree structure to suit the needs of a particular application. In FIGS. 2 and 3 illustrate "original" trees from which customized trees may be generated and illustrate some of the objects which may be present in databases. In FIGS. 4 and 5 of the example, a technique of creating a starting point for a customized tree by selecting a "Create customized tree" action from a pop-up is illustrated. FIGS. 6 and 7 illustrate adding an element to the customized tree through the selection of an "Add folder to tree" action from a pop-up.

In particular, FIG. 7 illustrates a graphical user interface for adding filter criteria to an element, by which the user may restrict the elements depicted to those desired. In this manner, customized trees may be constructed of different elements, with different relationships between the elements, and views of the contents of the elements may be filtered to provide views consistent with the needs of users in various applications. The example further illustrates, in the remaining figures, the opening of customized trees that have been created and modification of those trees.

FIG. 2 is an illustration of a tree within a window 201, generated by a tree-based application. A database object may be represented using a tree, with folder objects in the tree representing the different databases and objects within these databases. The folder objects in the tree are shown in window 201. Within the window 201 is a subwindow 205 which displays a visual representation of the tree showing the objects contained in the tree. The systems folder 207 is shown as the root of the particular tree in this example.

FIG. 3 is an illustration of a tree with multiple branches and multiple objects, generated by a tree-based application. The tree-based application may include different databases, including a Universal Database 305 (illustrated as UDB1), a DataJoiner Server 307, DB2 for the OS/390 operating system 309 (illustrated as MVS1), or any number of database systems. Each database may contain other objects just as DSN1 313 contains the objects 315 as illustrated in the present example. As one skilled in the art will appreciate, there is no theoretical limit to how many objects or what types of objects may be contained within other objects.

FIG. 4 illustrates the tree illustrated in FIG. 3, within window 401, with a pop-up that enables a user to create a customized tree. Initially, a user selects a folder object from the original tree to be a starting object. In this illustration, object DSN1 403 is chosen as an initial starting point in creating a customized tree. The user can then choose an action to indicate a customized tree is to be created. In the present illustration, the customized tree creator 224 activates pop-up 405. The pop-up 405 contains the user selection "Create customized tree" 407, which is shown highlighted. Additionally, the pop-up 405 includes an "Open new Control Center" 409 action, a "Change" 411 action, and a "Remove" 413 action. After activating the highlighted choice, "Create customized tree", in this example, the create customized tree process is activated.

FIG. 5 illustrates a "Customized Tree" window 501, generated by the customized tree creator 118, which is displayed after a "Create customized tree " action 407 is selected. In the window 501, the starting folder object is the DSN1 503, folder object selected in FIG. 4. The window is a duplicate of the window of FIG. 4, except that only the database DSN1 appears in the "Customized Tree" window 501. In this or a similar manner, an initial starting point for a customized tree can be created.

After a starting point for the customized tree has been created, the process of transforming the starting point into a customized tree structure to fulfill the needs of a particular user can be undertaken. FIG. 6 illustrates an example augmentation of the initial starting point of a customized tree. In this case, a database object is added to the customized tree. A user can add objects to the tree in the order the user wishes them to appear. For example, if a user wants to add a folder containing all the tables with the schema JONES that are in the DSN1 database, the user would select the DSN1 folder object 611. A pop-up 603 would then be activated by the customized tree creator 118. The pop-up 603 includes actions that can be taken for the selected folder object. For illustration, the actions may include: "Add folder to tree" 605, "Change folder" 607, and "Remove folder" 609. In the illustration, the "Add folder to tree" 605 appears highlighted and is the action selected.

FIG. 7 illustrates an Add Folder to Tree window 701, generated by the customized tree creator 118, that is displayed in response to selection of the "Add folder to tree" 605 action. In the Add Folder to Tree window, an object type field 703 is provided. Object types may include tables, storage groups, tablespaces and a variety of other types. Those skilled in the art will recognize that a theoretically infinite variety of objects can be added. Additionally, in the present illustration of the invention, a folder label box 705 is provided. A folder label is a name for a folder, which will be displayed on the customized tree. In FIG. 7, the folder label is "All JONES tables".

The folder label 705 can be used to distinguish between multiple folders enclosed in another folder. The folder label 705 may also provide an indication of the filter which is applied to the object. The Add Folder to Tree window 701 also enables a user to provide table filter information 707. The Illustrated fields 709, 711, and 713 illustrate example criteria for a filter. A criteria is entered in field 709, then field 711 is used to specify how the criteria is to be compared with the comparison values in field 713. In the next line, the Schema 717 is checked via the technique of comparison chosen 719, for equality, to the comparison value Jones in field 721 which is set equal to JONES. The comparison criteria may be ">", "<>", "<" or any other of those well known in the art. In addition, compound filters may be created through Boolean logic comparisons, such as 715.

Filter criteria is used to determine objects to be contained within one of the objects of the customized tree, for example, the root object. For example, filter criteria may be used to determine which tables are to be contained in the DSN1 folder object. Once a filter has been created, if the tables upon which the filter is applied change, the filter automatically modifies the customized tree to reflect the changed tables upon receiving, for example, a REFRESH command, which refreshes the screen. In one example of a selection criteria technique, if a folder is created with Jones tables according to this example, when additional Jones tables are added, the additional Jones tables are included in the folder. However, one skilled in the art would recognize that other selection criteria techniques may be used with the principles of the present invention. When a user is satisfied with the filter which has been created, the user may lock in the values by clicking "OK" 723.

Figure 8:
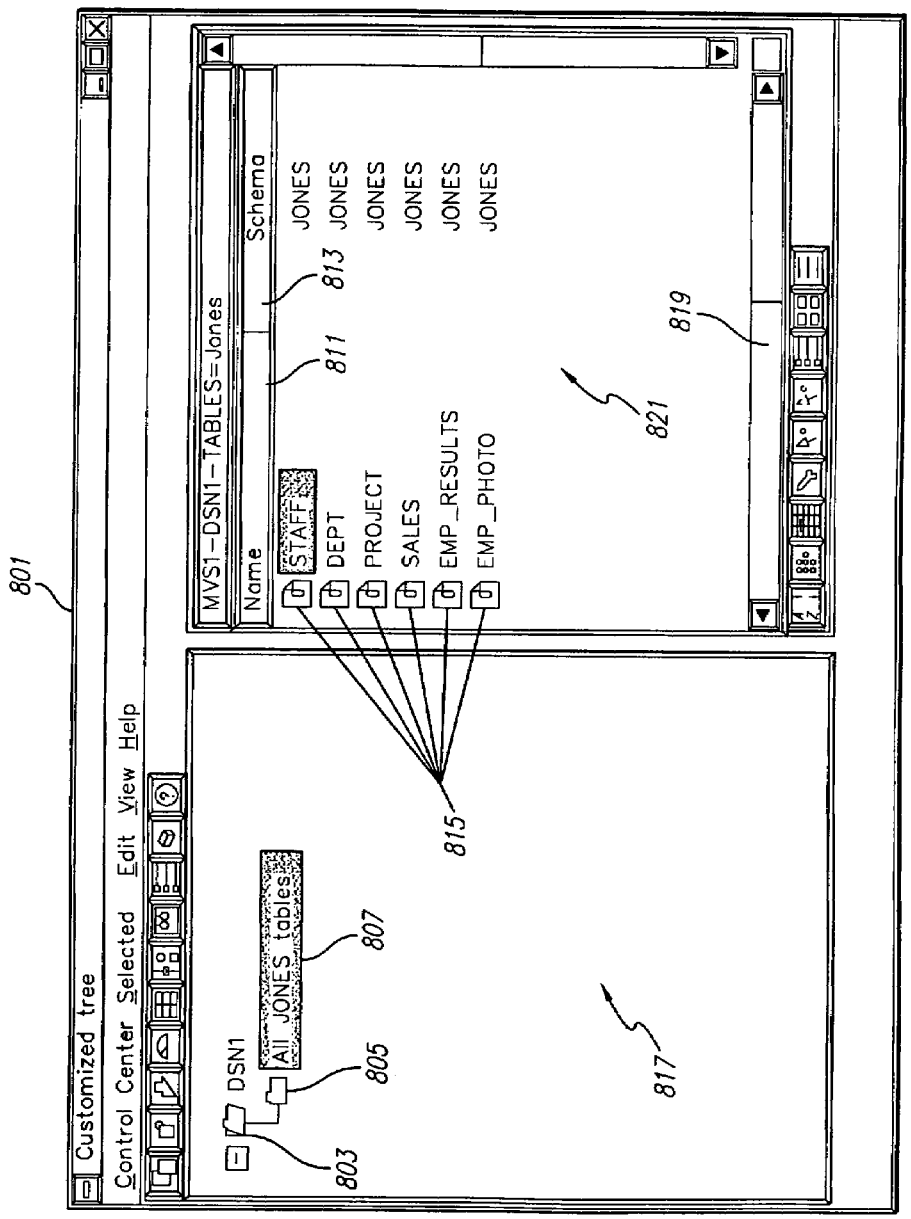
FIG. 8 illustrates the results of entering information into an Add Folder to Tree window of FIG. 7.

In FIG. 8 the Customized Tree window 801, generated by the customized tree creator 118, illustrates the results of entering information into an "Add Folder to Tree" window of FIG. 7. In FIG. 8, the original folder DSN1 803, is still present in the "Customized Tree" window 801 and a new folder object 805 is contained by the DSN1 folder object.

The tree has changed to include the folder 805 with the label "All JONES tables" 807. The new folder appears in subwindow 817 below DSN1 803. The "All JONES tables" label 807 is highlighted as indicative that it is the present item in subwindow 817, which is selected.

The folders of the tree in the subwindow 817 on the left are considered containers. When the All JONES tables folder is selected (e.g., by clicking on it), the subwindow 821 displays the tables 815 contained in that folder. For example, the All JONES Tables folder contains multiple tables, including, for example, a STAFF table. Fields 811, and 813 are labels for the content of the folder 805. Horizontal scroll bar 819 is included so that all of the contents of the elements contained in folder 805 may be displayed even if the elements occupy a larger area than can be displayed in window 821.

Figure 9:
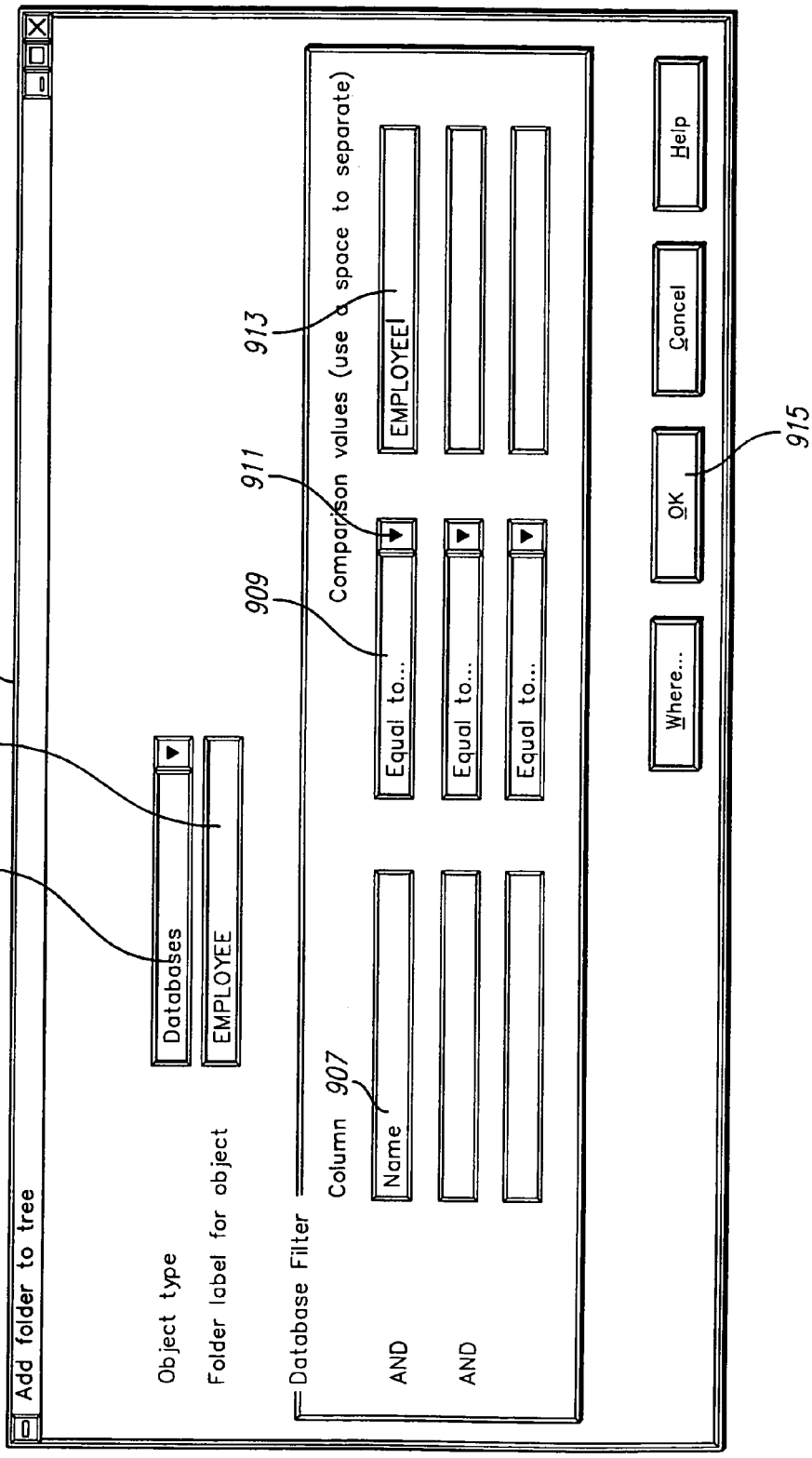
FIG. 9 illustrates another Add Folder to Tree window that is displayed in response to selection of the "Add folder to tree" action.

FIG. 9 illustrates another "Add Folder to Tree" window 901, generated by the customized tree creator 118, that is displayed in response to a selection of the "Add folder to tree" action. In this example a user has decided to add a folder object to the customized tree. As shown in field 903 the object type to be added is a database which will be labeled EMPLOYEE, as shown in field 905, to the customized tree. The user highlights the DSN1 folder 803 and activates the pop-up. The user selects the "Add folder to tree" action from the pop-up. When the "Add folder to tree" action is activated the "Add Folder to Tree" window 901 is displayed by the customized tree creator 118. The user indicates that the object type is a database, as shown in field 903. In this Add Folder to Tree window, an object of type Databases is to be added, with label "EMPLOYEE" as entered in field 905. The filter criteria of Name, which is entered in field 907, is to be compared for equality, as specified in field 909, to EMPLOYEE as specified in field 913. When a user clicks "OK" 915 in the Add Folder to Tree window 901, the customized tree creator adds the EMPLOYEE database to the customized tree.

Figure 10:
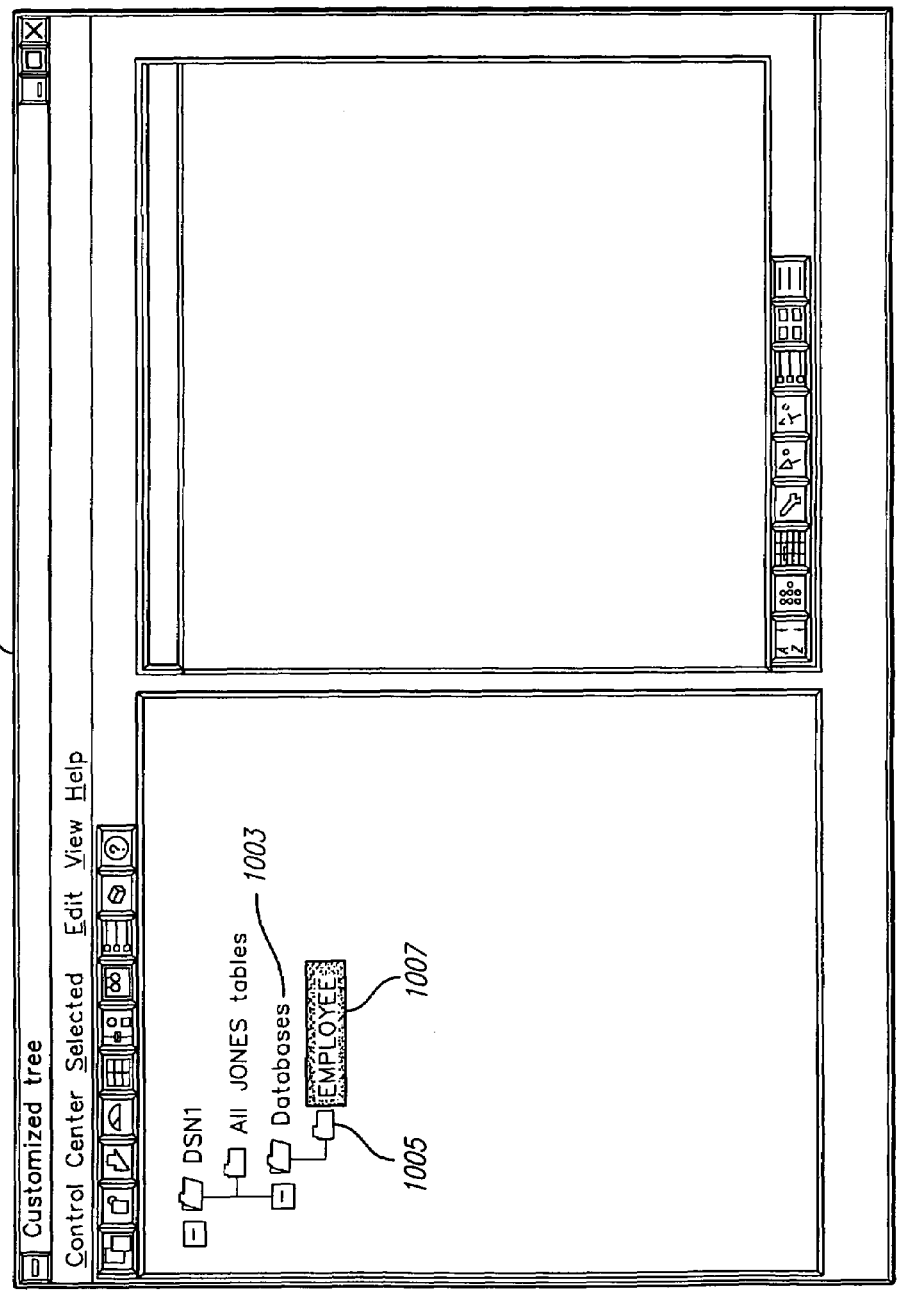
FIG. 10 illustrates the results of entering information into an Add Folder to Tree window of FIG. 9.

FIG. 10 illustrates the results of entering information into an "Add Folder to Tree" window 901 of FIG. 9. In FIG. 10, a new folder object, "Databases" 1003 is displayed, which contains an EMPLOYEE database 1005. The label EMPLOYEE is shown as selected by the highlight 1007.

Figure 11:
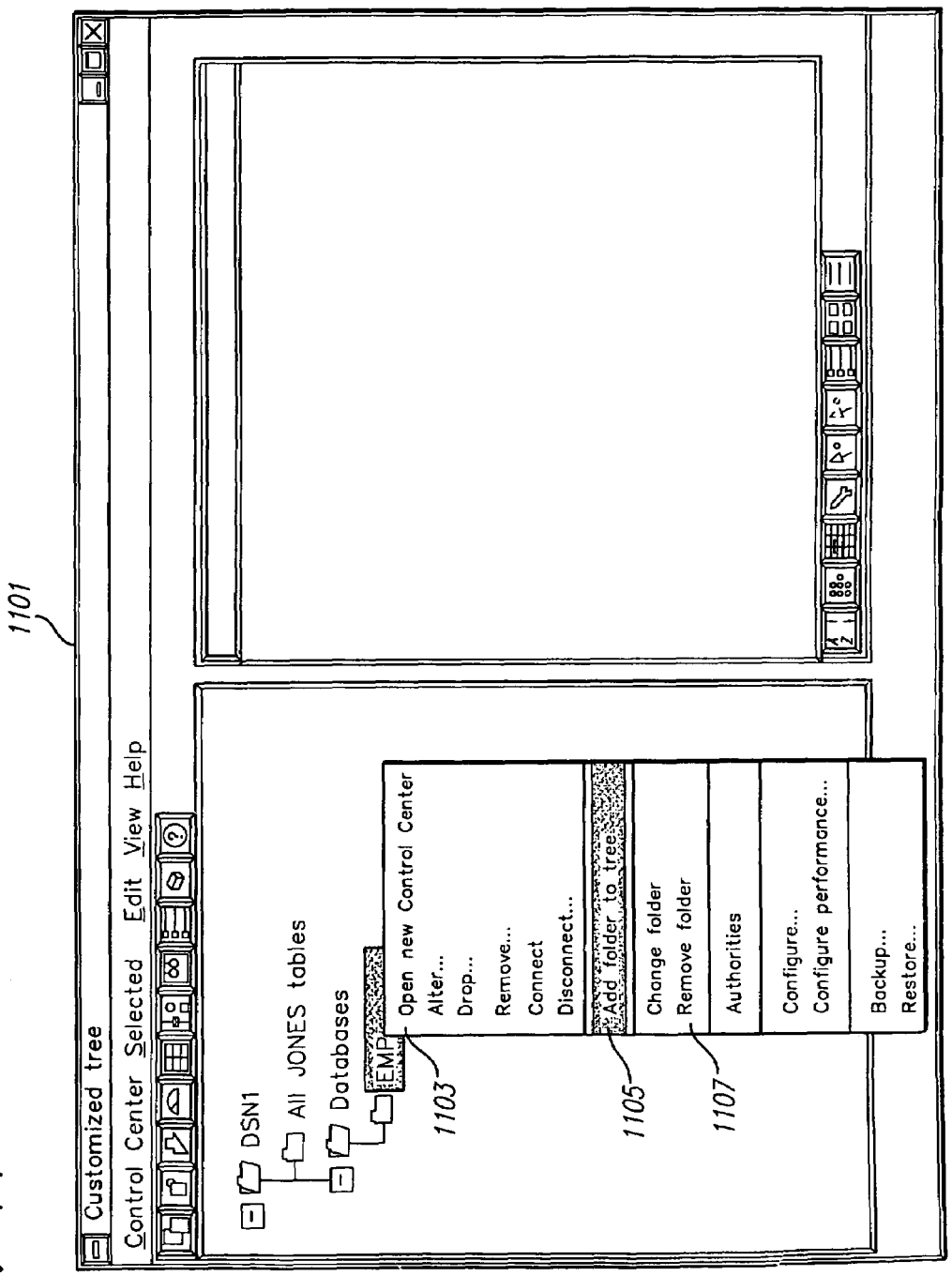
FIG. 11 illustrates a pop-up for adding another database folder object to a customized tree.

FIG. 11 illustrates a pop-up in the customized tree window 1101 for adding another database object to the present example of a customized tree. To add a table folder under the EMPLOYEE database folder, a user activates the pop-up 1103 and selects the "Add folder to tree" 1105 action from the pop-up, generated by the customized tree creator 118.

Figure 12:
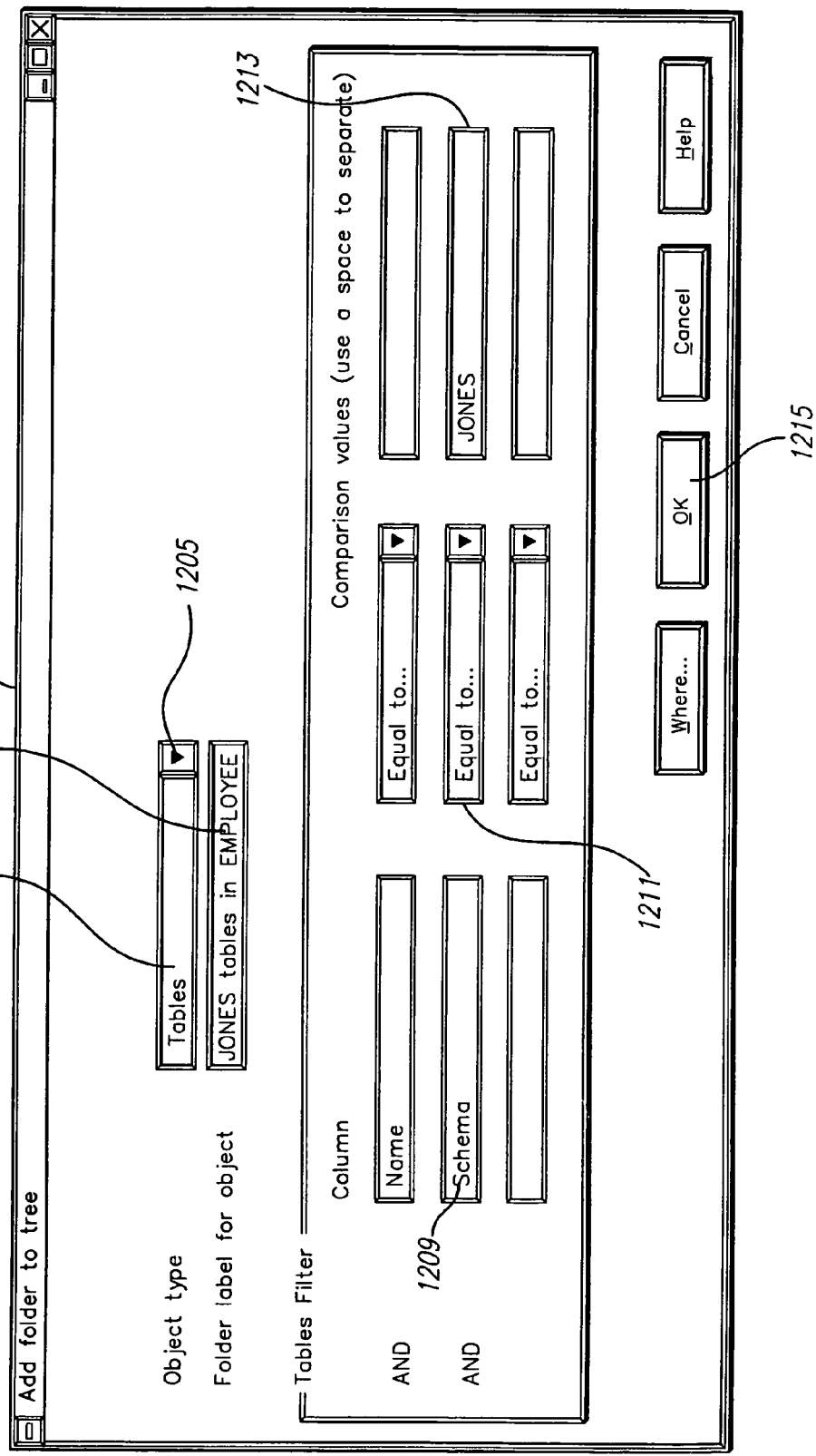
FIG. 12 illustrates another Add Folder to Tree window that is displayed in response to selection of the "Add folder to tree . . . " action.

FIG. 12 illustrates another "Add Folder to Tree" window 1201, generated by the customized tree creator 118, that is displayed in response to selection of the "Add folder to tree" action 1105. In this Add Folder to Tree window, an object of type "Tables" is entered in field 1203. The folder label of "JONES tables in EMPLOYEE" is created by entering "JONES tables in EMPLOYEE" in field 1207. The filter Schema 1209 is chosen to be "Equal to" 1211 JONES, as entered in field 1213. The user then clicks the "OK" button 1215 to accept the information as entered in window 1201.

Figure 13:
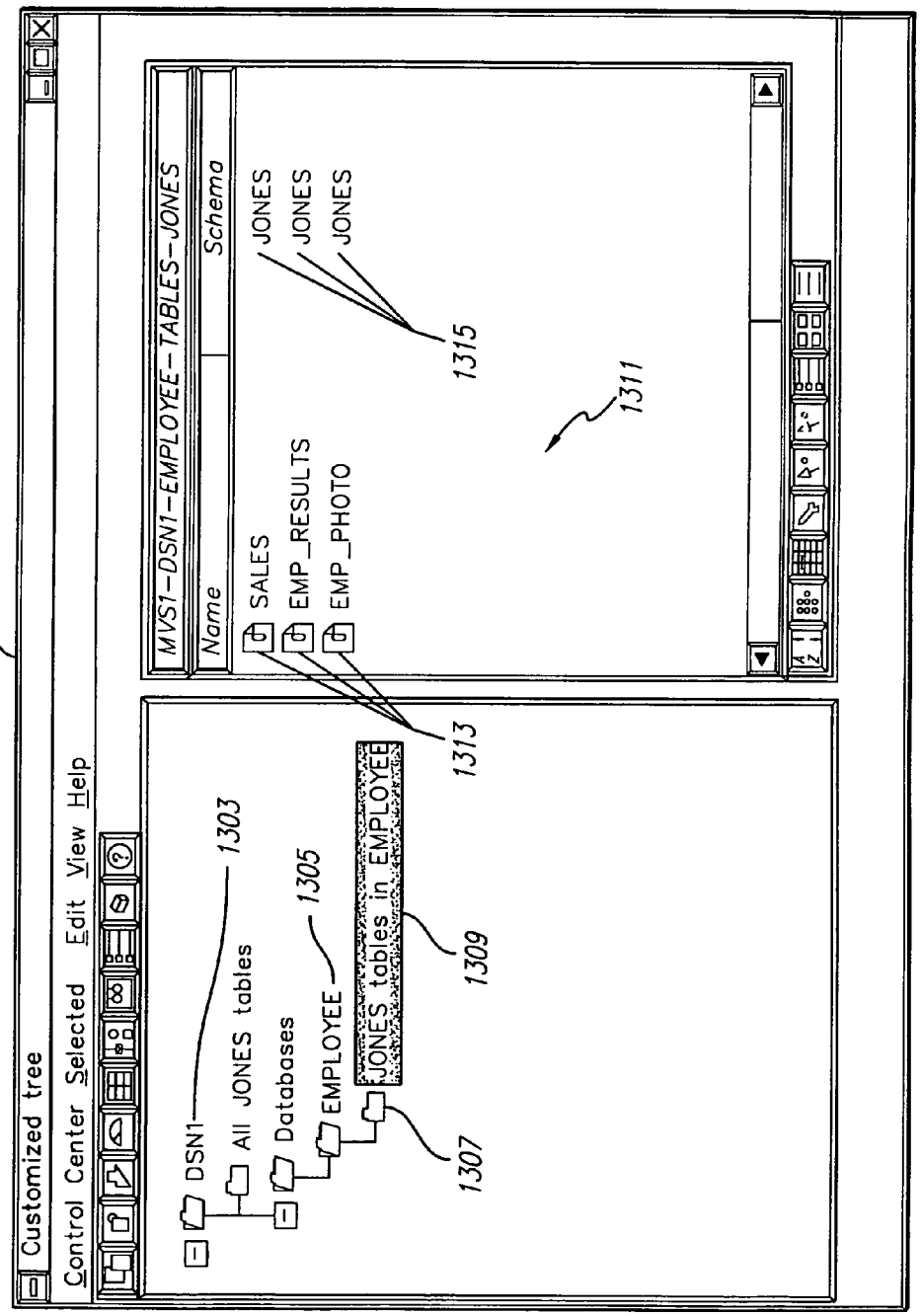
FIG. 13 illustrates the results of entering information into an Add Folder to Tree window of FIG. 12.

FIG. 13 illustrates the results of entering information into an Add Folder to Tree window 1201 of FIG. 12. When the user clicked the "OK" button 1215 of the Add Folder to Tree window 1201, a Tables folder 1307 labeled "JONES tables in EMPLOYEE" 1309 is added to the tree under the EMPLOYEE database 1305. The customized tree creator 118 adds Tables folder 1307 under the EMPLOYEE database 1305, and not under DSN1 1303, because the user invoked the "Add folder to tree" action from the pop-up while the EMPLOYEE database folder 1305 was highlighted (i.e. selected). The list on the subwindow 1311 shows those individual tables 1313 in the EMPLOYEE database 1305 that have the schema of JONES 1315. This customized tree could then be saved.

Figure 14:
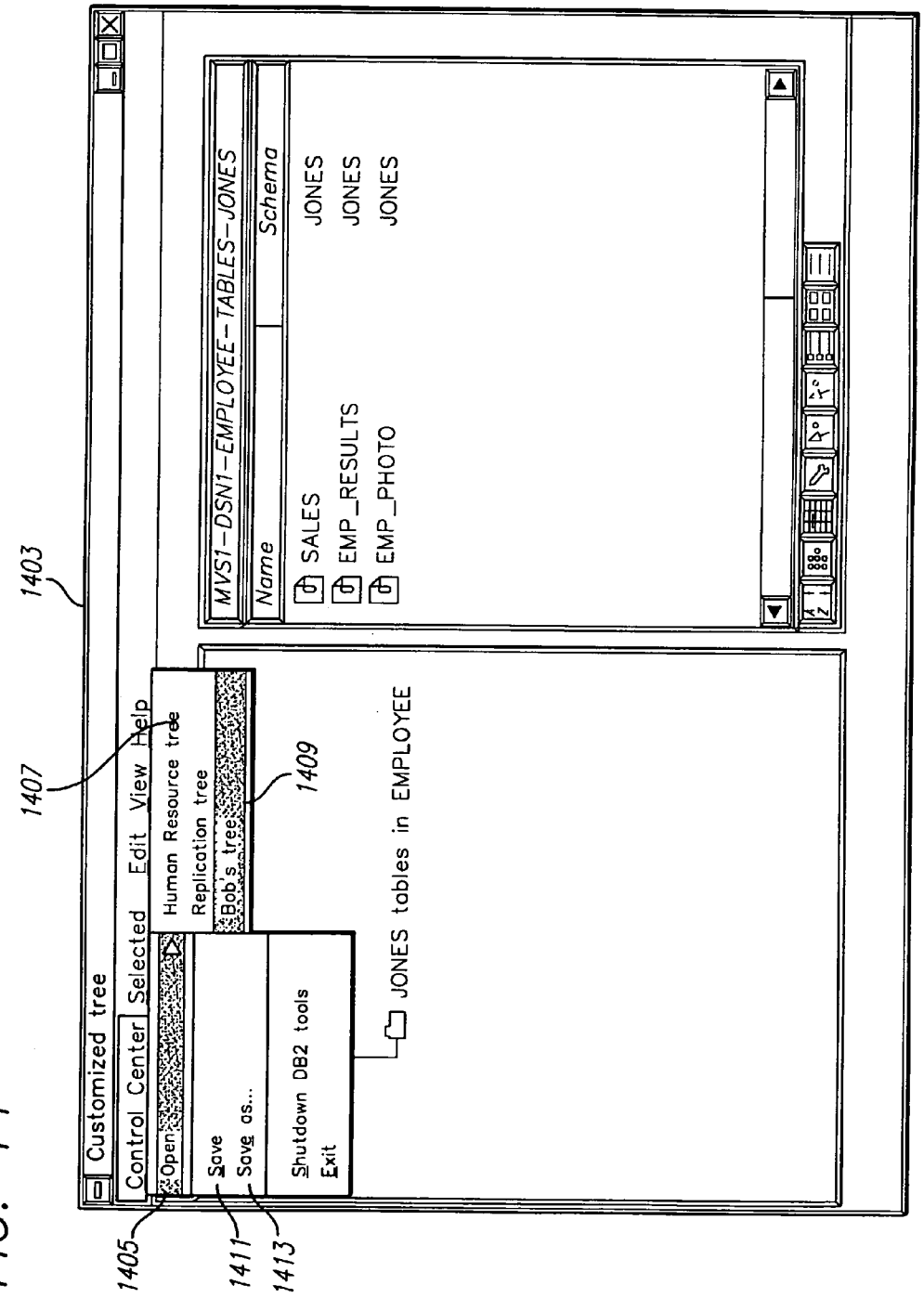
FIG. 14 illustrates launching an open command from a parent application.

FIG. 14 illustrates launching an open command from a parent application. To invoke an existing customized tree, a user selects "Open" 1405 from the window 1403 pull down menu. A list of existing trees follow in a cascade 1407, and the user can select one from the cascade list. In the present example Bob's tree 1409 has been selected as indicated by the highlight In this example, the customized tree may also be invoked from a customized tree window, for example customized tree windows as shown in FIGS. 5, 6, 8, 10, 11, 13, by choosing the "Open" action and then selecting one of the available objects to open. The customized tree is illustrated as being opened from the "Control Center" window only as a matter of convenience, and a customized tree may be opened from a "Customized Tree" or "Control Center" window with equivalent results.

Figure 15:
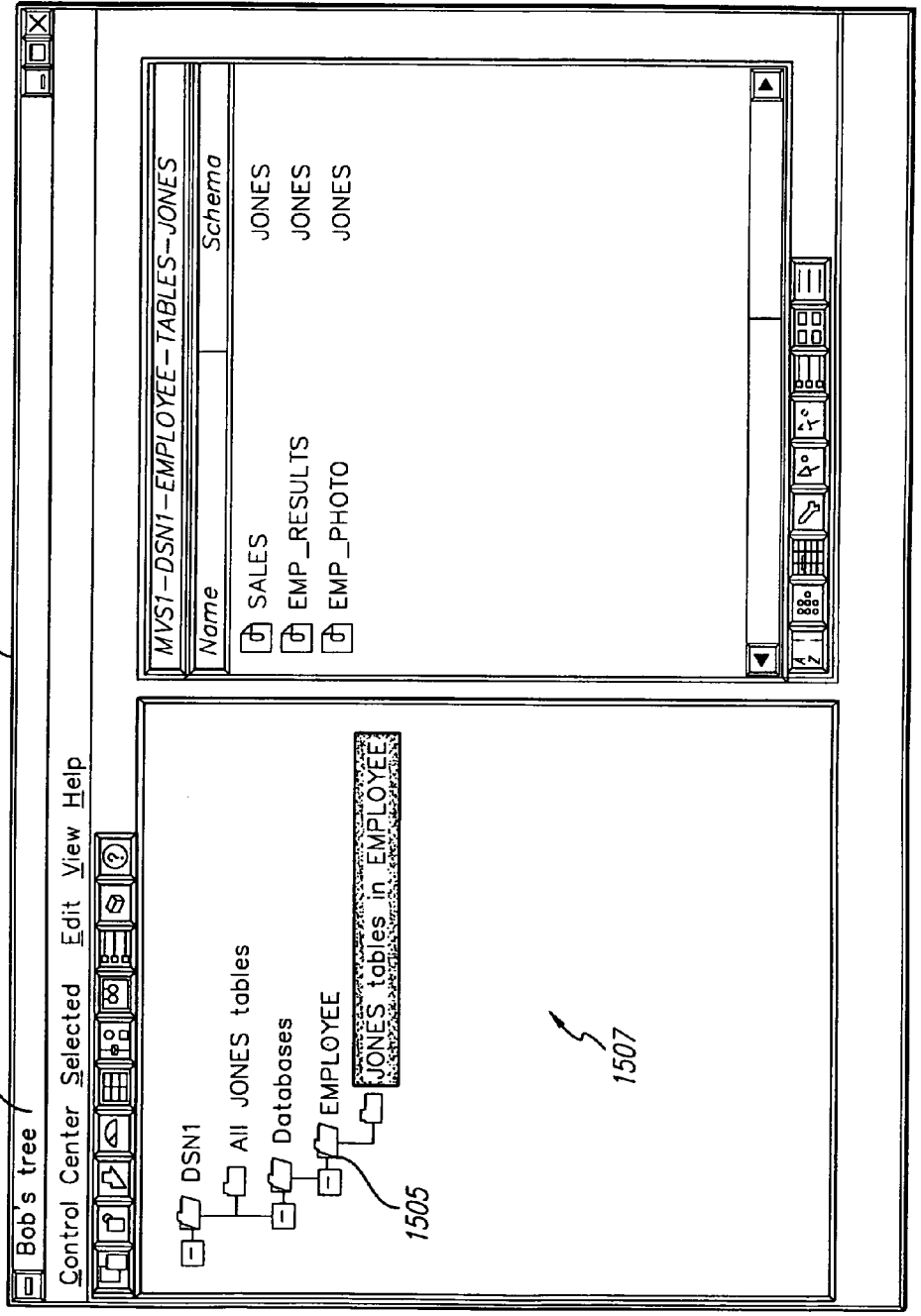
FIG. 15 illustrates the results of opening a customized tree.

FIG. 15 illustrates the results of opening a customized tree. In FIG. 15, "Bob's Tree" is displayed in the title line 1503 of the opened window 1501 in response to the "Open" and selection of Bob's Tree in FIG. 13. As the result of opening Bob's Tree, Bob's Tree is also displayed 1505 in the left subwindow 1507.

Additionally, to save a new customized tree or changes to an existing customized tree, a user would select "Save" 1411 or "Save as" 1413 from the pull down menu, as illustrated in FIG. 14. The tree would then be saved as a file either on a user's workstation or on a server.

Figure 16:
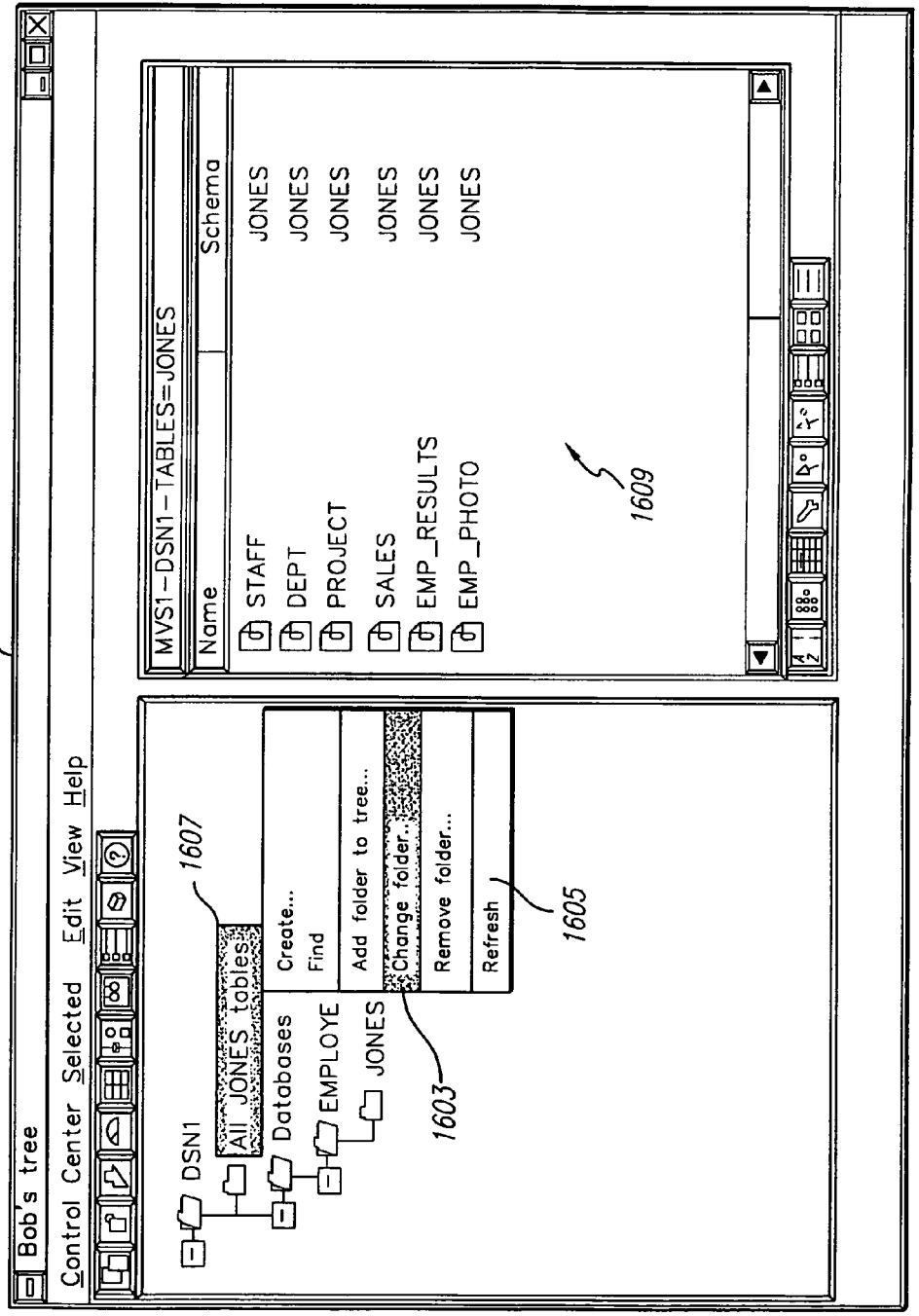
FIG. 16 illustrates changing a customized tree.

FIG. 16 illustrates a "Change Folder" action 1603 in pop-up 1605, generated by the customized tree creator 118. To change a customized tree, a user selects a folder object (e.g. 1607) on the tree. The subwindow 1609 shows the contents of the selected object 1607. The user activates the pop-up 1605, generated by the customized tree creator 118, and selects the "Change folder" action 1603 from the pop-up 1605 for the selected folder object 1607.

Figure 17:
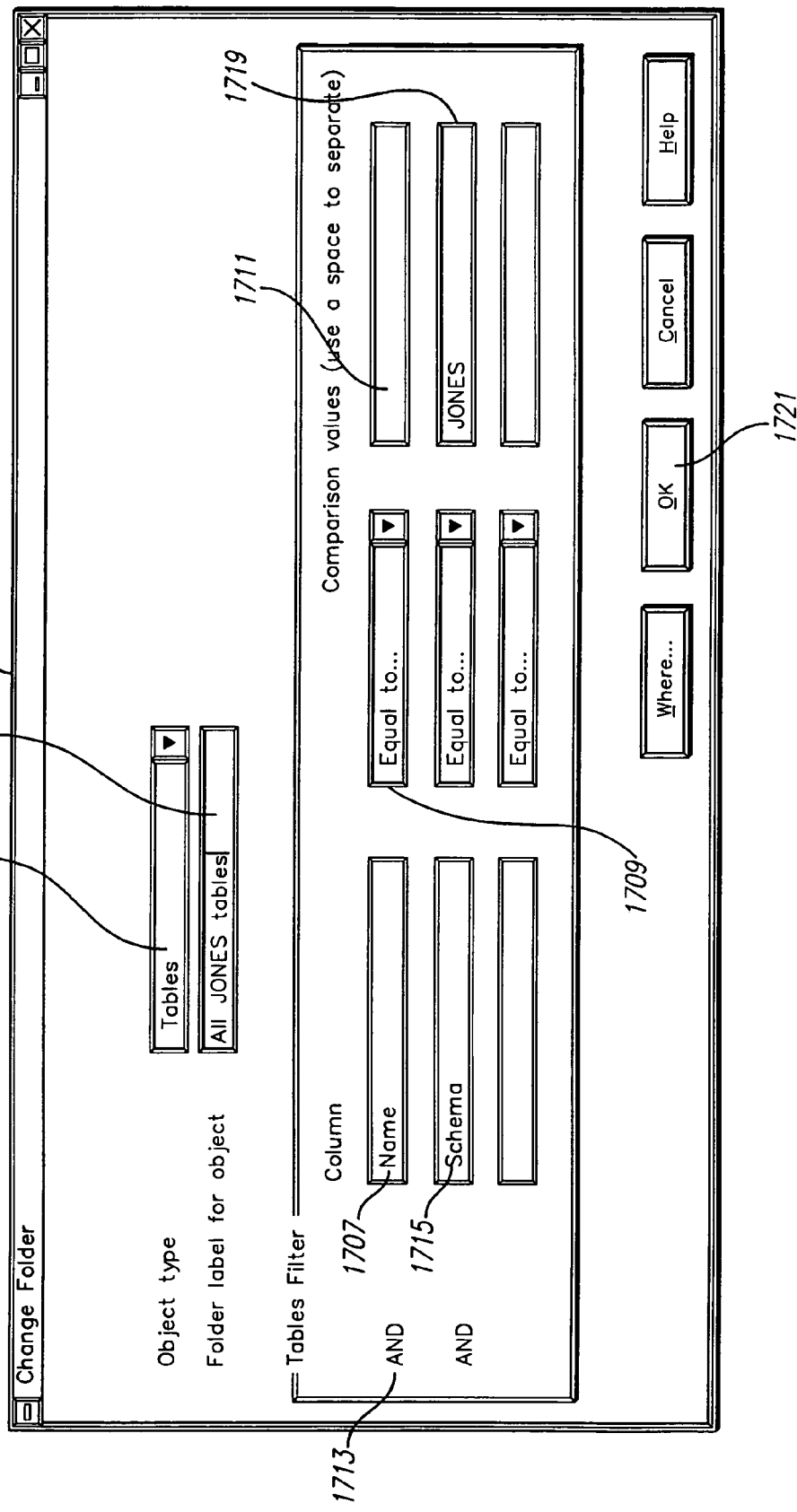
FIG. 17 illustrates a Change Folder window that is displayed in response to a "Change . . . "action.

FIG. 17 illustrates a Change Folder window 1701, generated by the customized tree creator 118, that is displayed in response to a "Change" action. The Change Folder window 1701 is the same as the Add Folder to Tree window 1201, except that the window reflects the selections previously made. In the present example the object type field is table 1703, and the Folder label for object field 1705 is "ALL JONES Tables". The filtering criteria 1707, 1709, 1711, 1713, 1715, and 1719 may be changed by the user if a different criteria is desired. The user makes changes desired and those changes take effect when the user clicks on the "OK" button 1721. The changes would have to be saved, for example, with the "Save" action 1311 and the contents of the object which had been selected 1607, may change as appropriate. The changed contents will then be reflected in the contents of the folder as displayed in the right subwindow when the object is selected, e.g. subwindow 1609.

Figure 18:
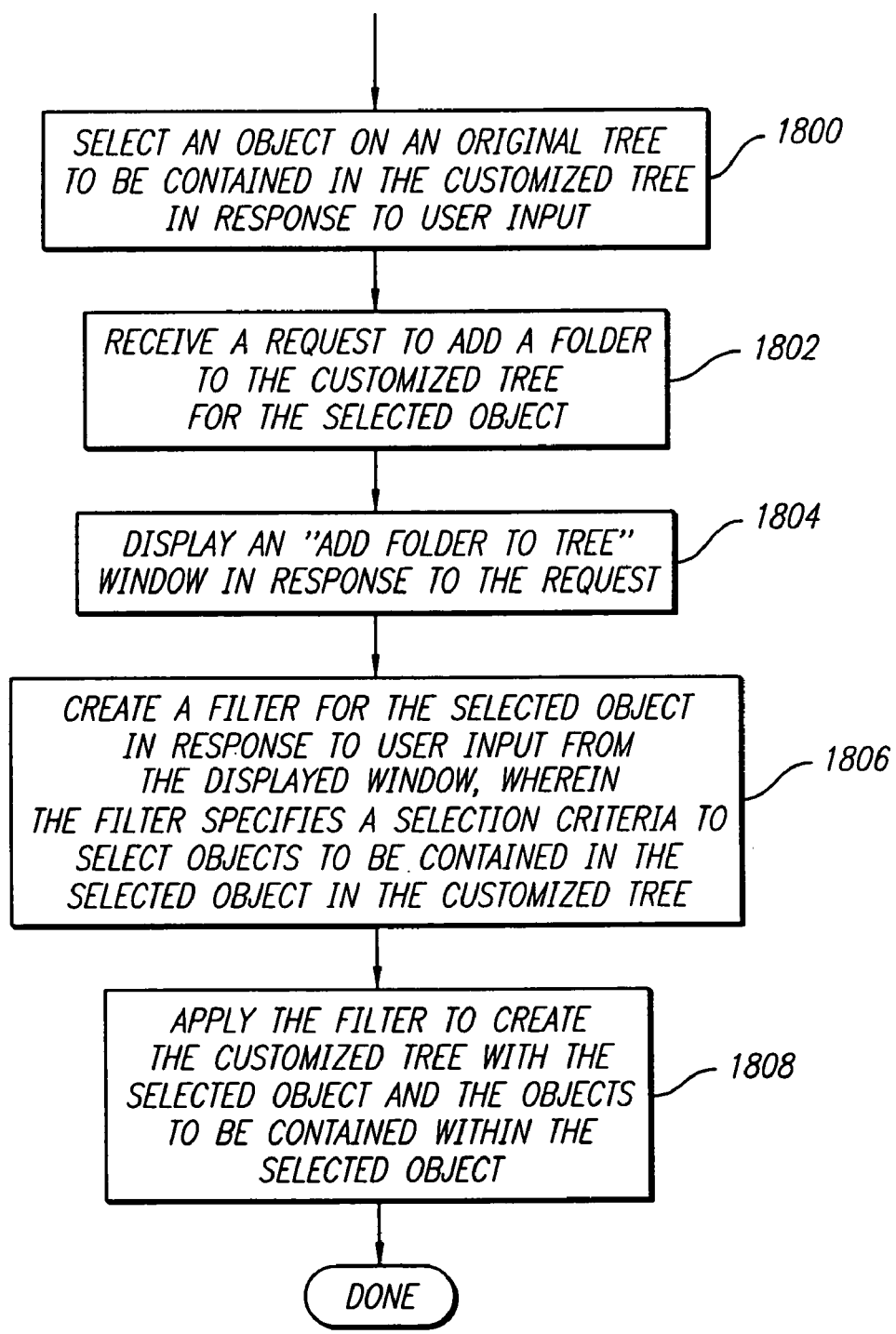
FIG. 18 is a flow diagram illustrating the steps performed by the customized tree creator to create a customized tree.

FIG. 18 is a flow diagram illustrating the steps performed by the customized tree creator 118 to create a customized tree. In Block 1800, the customized tree creator 118 selects an object on an original tree to be contained in the customized tree in response to user input. In Block 1802, customized tree creator 118 receives a request to add a folder to the customized tree for the selected object. In Block 1804, the customized tree creator 118 displays an "Add Folder to Tree" window in response to the request. In Block 1806, the customized tree creator 118 creates a filter for the selected object in response to user input from the displayed window. The filter specifies a selection criteria to select objects to be contained in the selected object in the customized tree. In Block 1808, the customized tree creator 118 applies the filter to create the customized tree with the selected object and the objects to be contained within the selected object.

Figure 19:
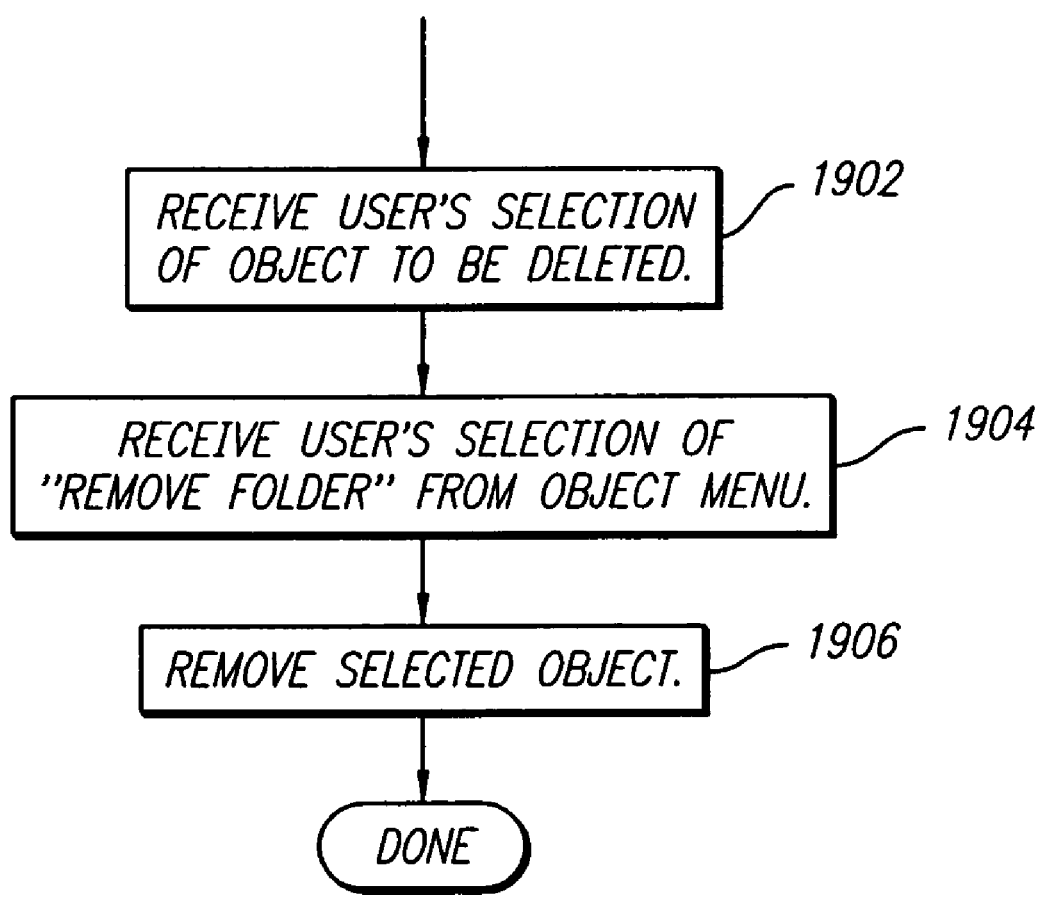
FIG. 19 is a flow diagram illustrating the steps performed by the customized tree creator to delete an object from a customized tree.

FIG. 19 is a flow diagram illustrating the steps performed by the customized tree creator 118 to delete an object from a customized tree. In Block 1902, the customized tree creator 118 receives a user's selection of an object to be deleted. In Block 1904, the customized tree creator 118 receives the user's selection of the "Remove folder" choice 1107 from the pop-up, as illustrated in FIG. 11. In Block 1906, the customized tree creator 118 removes the selected object from the tree.

Figure 20:
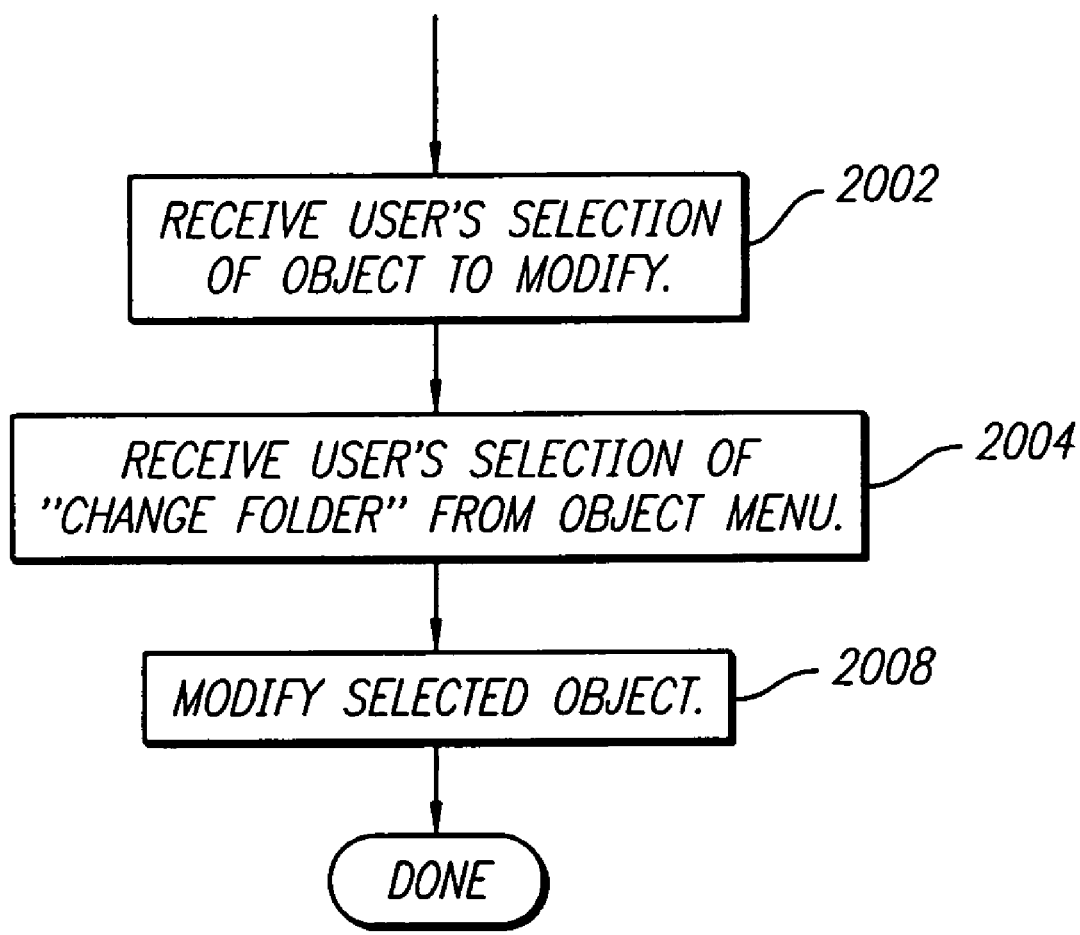
FIG. 20 is a flow diagram illustrating the steps performed by the customized tree creator to modify an object in a customized tree.

FIG. 20 is a flow diagram illustrating the steps performed by the customized tree creator 118 to modify an object in a customized tree. In Block 2002, the customized tree creator 118 receives a user's selection of an object to be deleted. In Block 2004, the customized tree creator 118 receives the user's selection if the "Change folder" choice 1603 from the pop-up, as illustrated in FIG. 16. In Block 2006, the customized tree creator 118 modifies the selected object.

CONCLUSION

This concludes the description of the preferred embodiment of the invention. The following describes some alternative embodiments for accomplishing the present invention. For example, any type of computer, such as a mainframe, minicomputer, or personal computer, or computer configuration, such as a timesharing mainframe, local area network, or standalone personal computer, could be used with the present invention.

Those skilled in the art will recognize that the above description of an embodiment of the invention is merely an example of a single embodiment of the invention meant to serve as an illustration of one example of how the invention might be implemented. One skilled in the art will recognize that the concepts and ideas of the invention may be embodied in a virtually limitless combination of user screens, input mechanisms, drop down menus, pointing mechanisms, control fields, command lines and the like, which are input and control mechanisms for computers and are well known in the art. Those skilled in the art will not construe the above described menu system as constraining the ideas and claims of the invention, but merely depicting an implementation which may vary according to application and individual preferences.

The foregoing description of the preferred embodiment of the invention has been presented for the purposes of illustration and description. It is not intended to be exhaustive or to limit the invention to the precise form disclosed. Many modifications and variations are possible in light of the above teaching. It is intended that the scope of the invention be limited not by this detailed description, but rather by the claims appended hereto.

What is claimed is:

1. A method of creating a customized tree in a computer from an original tree containing objects from a data storage device connected to the computer, the method comprising:
    creating a filter in response to user input, wherein the filter specifics a selection criteria to select objects to be contained within a selected object on the customized tree;
    saving the filter and the specified selection criteria;
    selecting one or more objects on the original tree to be contained in the customized tree in response to user input by applying the filter, wherein the one or more objects are located in disparate places across different branches of the original tree;

linking the selected objects from the disparate places to each other in the customized tree in a user-specified manner; and defining security restrictions for accessing the selected objects using the customized tree.

2. The method of claim 1, wherein the step of applying the filter further comprises the step of selecting objects from multiple parent objects.

3. The method of claim 2, wherein the multiple parent objects are contained on multiple platforms.

4. The method of claim 1, wherein if the objects to be selected by the filter change, the customized tree is automatically updated to reflect the changed objects.

5. The method of claim 1, further comprising the step of modifying the customized tree.

6. The method of claim 5, wherein the step of modifying further comprises the step of adding an object to the customized tree.

7. The method of claim 5, wherein the step of modifying further comprises the step of removing an object of the customized tree.

8. The method of claim 5, wherein the step of modifying further comprises the step of copying an object into the customized tree.

9. The method of claim 5, wherein the step of modifying further comprises the step of copying an object from a first position in the customized tree to a second position in the customized tree.

10. The method of claim 5, wherein the step of modifying further comprises the step of removing the customized tree.

11. The method of claim 5, wherein the step of modifying further comprises the step of changing an object.

12. The method of claim 1, further comprising the step of using the customized tree to simultaneously perform an action on multiple objects contained in the customized tree.

13. The method of claim 1, further comprising the step of restricting access to the customized tree.

14. The method of claim 1, further comprising the step of enabling customization of labels for objects in the customized tree.

15. The method of claim 14, wherein each label distinguishes between different objects of a similar type.

16. The method of claim 14, wherein each label is an indicator of a filter.

17. The method of claim 1, further comprising the step of providing graphical user interfaces for creating the customized tree and wherein the user input is received from one or more graphical user interfaces.

18. The method of claim 1, wherein the customized tree contains a subset of the objects of the original tree.

19. The method of claim 1, wherein the objects of the customized tree are organized in a user-specified manner.

20. The method of claim 1, further comprising the step of creating multiple customized trees.

21. An apparatus for creating a customized tree in a computer, the apparatus comprising:

a computer having a data storage device connected thereto, wherein the data storage device stores objects contained in an original tree; and one or more computer programs for creating a filter in response to user input, wherein the filter specifies a selection criteria to select objects to be contained within a selected object on the customized tree, saving the filter and the specified selection criteria, selecting the object on the original tree to be contained in the customized tree in response to user input by applying the filter, wherein the one or more objects are located in disparate places across different branches of the original tree, linking the selected objects from the disparate places to each other in the customized tree in a user-specified manner, and defining security restrictions for accessing the selected objects using the customized tree.

22. The apparatus of claim 21, wherein the means for applying the filter further comprises the means for selecting objects from multiple parent objects.

23. The apparatus of claim 22, wherein the multiple parent objects are contained on multiple platforms.

24. The apparatus of claim 21, wherein if the objects to be selected by the filter change, the customized tree is automatically updated to reflect the changed objects.

25. The apparatus of claim 21, further comprising means for modifying the customized tree.

26. The apparatus of claim 25, wherein the means for modifying further comprises means for adding an object to the customized tree.

27. The apparatus of claim 25, wherein the means for modifying further comprises means for removing an object of the customized tree.

28. The apparatus of claim 25, wherein the means for modifying further comprises means for copying an object into the customized tree.

29. The apparatus of claim 25, wherein the means for modifying further comprises means for copying an object from a first position in the customized tree to a second position in the customized tree.

30. The apparatus of claim 25, wherein the means for modifying further comprises means for removing the customized tree.

31. The apparatus of claim 25, wherein the means for modifying further comprises means for changing an object.

32. The apparatus of claim 21, further comprising means for using the customized tree to simultaneously perform an action on multiple objects contained in the customized tree.

33. The apparatus of claim 21, further comprising means for restricting access to the customized tree.

34. The apparatus of claim 21, further comprising means for enabling customization of labels for objects in the customized tree.

35. The apparatus of claim 34, wherein each label distinguishes between different objects of a similar type.

36. The apparatus of claim 34, wherein each label is an indicator of a filter.

37. The apparatus of claim 21, further comprising means for providing graphical user interfaces for creating the customized tree and wherein the user input is received from one or more graphical user interfaces.

38. The apparatus of claim 21, wherein the customized tree contains a subset of the objects of the original tree.

39. The apparatus of claim 21, wherein the objects of the customized tree are organized in a user-specified manner.

40. The apparatus of claim 21, further comprising means for creating multiple customized trees.

41. An article of manufacture comprising a computer program carrier readable by a computer and embodying one or more instructions executable by the computer to perform method steps for creating a customized tree from an original tree containing objects from a data storage device connected to the computer, the method comprising the steps of:

creating a filter in response to user input, wherein the filter specifies a selection criteria to select objects to be contained within a selected object on the customized tree;

saving the filter and the specified selection criteria;

selecting one or more objects on the original tree to be contained in the customized tree in response to user input by applying the filter, wherein the one or more objects are located in disparate places across different branches of the original tree;

linking the selected objects from the disparate places to each other in the customized tree in a user-specified manner, and defining security restrictions for accessing the objects using the customized tree.

42. The article of manufacture of claim 41, wherein the step of applying the filter further comprises the step of selecting objects from multiple parent objects.

43. The article of manufacture of claim 42, wherein the multiple patent objects are contained on multiple platforms.

44. The article of manufacture of claim 41, wherein if the objects to be selected by the filter change, the customized tree is automatically updated to reflect the changed objects.

45. The article of manufacture of claim 41, further comprising the step of modifying the customized tree.

46. The article of manufacture of claim 45, wherein the step of modifying further comprises the step of adding an object to the customized tree.

47. The article of manufacture of claim 45, wherein the step of modifying further comprises the step of removing an object of the customized tree.

48. The article of manufacture of claim 45, wherein the step of modifying further comprises the step of copying an object into the customized tree.

49. The article of manufacture of claim 45, wherein the step of modifying further comprises the step of copying an object from a first position in the customized tree to a second position in the customized tree.

50. The article of manufacture of claim 45, wherein the step of modifying further comprises the step of removing the customized tree.

51. The article of manufacture of claim 45, wherein the step of modifying further comprises the step of changing an object.

52. The article of manufacture of claim 41, further comprising the step of using the customized tree to simultaneously perform an action on multiple objects contained in the customized tree.

53. The article of manufacture of claim 41, further comprising the seep of restricting access to the customized tree.

54. The article of manufacture of claim 41, further comprising the step of enabling customization of labels for objects in the customized tree.

55. The article of manufacture of claim 54, wherein each label distinguishes between different objects of a similar type.

56. The article of manufacture of claim 54, wherein each label is an indicator of a filter.

57. The article of manufacture of claim 41, further comprising the step of providing graphical user interfaces for creating the customized tree and wherein the user input is received from one or more graphical user interfaces.

58. The article of manufacture of claim 41, wherein the customized tree contains a subset of the objects of the original tree.

59. The article of manufacture of claim 41, wherein the objects of the customized tree are organized in a user-specified manner.

60. The article of manufacture of claim 41, further comprising the step of creating multiple customized trees.

61. A method of creating a customized tree in a computer from an original tree containing objects from a data storage device connected to the computer, the method comprising:

selecting one or more objects on the original tree to be contained in the customized tree in response to user input;

creating a filter for the selected object in response to user input, wherein the filter comprises user specified filter criteria, a user specified comparator operator, and a user-specified comparison value, wherein the user-specified comparator operator specifies how the user-specified filter criteria is compared with the user-specified comparison value, to determine objects to be contained within the selected object on the customized tree;

applying the filter to create the customized tree with the selected object and the objects to be contained within the selected object; and linking the selected objects in a user-specified manner.

62. The method of claim 61, wherein the step of applying the filter further comprises selecting objects from multiple parent objects.

63. The method of claim 61, wherein if the objects to be selected by the filter change, the customized tree is automatically updated to reflect the changed objects.

64. The method of claim 61, further comprising modifying the customized tree.

65. The method of claim 64, wherein the modifying comprises adding an object to the customized tree.

66. The method of claim 64, wherein the modifying comprises removing an object of the customized tree.

67. The method of claim 64, wherein the modifying comprises copying an object into the customized tree.

68. The method of claim 64, wherein the modifying comprises copying an object from a first position in the customized tree to a second position in the customized tree.

69. The method of claim 64, wherein the modifying comprises removing the customized tree.

70. The method of claim 64, wherein the modifying comprises changing an object.

71. The method of claim 61, further comprising using the customized tree to simultaneously perform an action on multiple objects contained in the customized tree.

72. The method of claim 61, further comprising restricting access to the customized tree.

73. The method of claim 61, further comprising enabling customization of labels for objects in the customized tree.

74. The method of claim 61, further comprising providing graphical user interfaces for creating the customized tree and wherein the user input is received from one or more graphical user interfaces.

75. An apparatus for creating a customized tree in a computer, the apparatus comprising:

a computer having a data storage device connected thereto, wherein the data storage device stores objects contained in an original tree;

one or more computer programs, executed by the computer, for selecting an object on the original tree to be contained in the customized tree in response to user input;

one or more computer programs, executed by the computer, for creating a filter for the selected object in response to user input, wherein the filter comprises user specified filter criteria, a user specified comparator operator, and a user-specified comparison value, wherein the user-specified comparator operator specifies how the user-specified filter criteria is compared with the user-specified comparison value, to determine objects to be contained within the selected object on the customized tree;

one or more computer programs, executed by the computer for applying the filter to create the customized tree with the selected object and the objects to be contained within the selected object; and one or more computer programs, executed by the computer, for linking the selected objects in a user-specified manner.

76. The apparatus of claim 75, wherein the one or more computer programs for applying the filter are configured to select the objects from multiple parent objects.

77. The apparatus of claim 75, wherein if the objects to be selected by the filter change, the customized tree is automatically updated to reflect the changed objects.

78. The apparatus of claim 75, further comprising one or more computer programs for modifying the customized tree.

79. The apparatus of claim 78, wherein the one or more computer programs for modifying are configured to add an object to the customized tree.

80. The apparatus of claim 78, wherein the one or more computer programs for modifying are configured to remove an object of the customized tree.

81. The apparatus of claim 78, wherein the one or more computer programs for modifying are configured to copy an object into the customized tree.

82. The apparatus of claim 78, wherein the one or more computer programs for modifying are configured to copy an object from a first position in the customized free to a second position in the customized tree.

83. The apparatus of claim 78, wherein one or more computer programs for modifying are configured to remove the customized tree.

84. The apparatus of claim 78, wherein one or more computer programs for modifying are configured to change an object.

85. The apparatus of claim 75, further comprising one or more computer programs for using the customized tree to simultaneously perform an action on multiple objects contained in the customized tree.

86. The apparatus of claim 75, further comprising one or more compute programs for restricting access to the customized tree.

87. The apparatus of claim 75, further comprising one or more computer programs for enabling customization of labels for objects in the customized tree.

88. The apparatus of claim 75, further comprising one or more computer programs for providing graphical user interfaces for creating the customized tree and wherein the user input is received from one or more graphical user interfaces.

89. An article of manufacture comprising a computer program carrier readable by a computer and embodying one or more instructions executable by the computer to perform a method for creating a customized tree from an original tree containing objects from a data storage device connected to the computer, the method comprising:

selecting one or more objects on the original tree to be contained in the customized tree in response to user input;

creating a filter for the selected object in response to user input, wherein the filter comprises user specified filter criteria, a user specified comparator operator, and a user-specified comparison value, wherein the user-specified comparator operator specifies how the user-specified filter criteria is compared with the user-specified comparison value, to determine objects to be contained within the selected object on the customized tree;

applying the filter to create the customized tree with the selected object and the objects to be contained within the selected object; and linking the selected objects in a user-specified manner.

90. The article of manufacture of claim 89, wherein applying the filter comprises selecting objects from multiple parent objects.

91. The article of manufacture of claim 89, wherein if the objects to be selected by the filter change, the customized tree is automatically updated to reflect the changed objects.

92. The article of manufacture of claim 89, wherein the method further comprises modifying the customized tree.

93. The article of manufacture of claim 92, wherein the modifying comprises adding an object to the customized tree.

94. The article of manufacture of claim 92, wherein the modifying comprises removing an object of the customized tree.

95. The articlee of manufacture of claim 92, wherein the modifying comprises copying an object into the customized tree.

96. The article of manufacture of claim 92, wherein the modifying comprises copying an object from a first position in the customized tree to a second position in the customized tree.

97. The article of manufacture of claim 92, wherein the modifying comprises removing the customized tree.

98. The article of manufacture of claim 92, wherein the modifying comprises changing an object.

99. The article of manufacture of claim 89, wherein the method further comprises using the customized tree to simultaneously perform an action on multiple objects contained in the customized tree.

100. The article of manufacture of claim 89, wherein the method further comprises restricting access to the customized tree.

101. The article of manufacture of claim 89, wherein the method further comprises enabling customization of labels for objects in the customized tree.

102. The article of manufacture of claim 89, wherein the method further comprises providing graphical user interfaces for creating the customized tree and wherein the user input is received from one or more graphical user interfaces.

* * * * *

UNITED STATES PATENT AND TRADEMARK OFFICE
CERTIFICATE OF CORRECTION

PATENT NO. : 7,028,043 B2  Page 1 of 1
APPLICATION NO. : 09/248736
DATED : April 11, 2006
INVENTOR(S) : Bleizeffer et al.

It is certified that error appears in the above-identified patent and that said Letters Patent is hereby corrected as shown below:

Column 10, line 60, "specifics" should read –specifics--;

Signed and Sealed this

First Day of August, 2006

JON W. DUDAS
*Director of the United States Patent and Trademark Office*

UNITED STATES PATENT AND TRADEMARK OFFICE
CERTIFICATE OF CORRECTION

PATENT NO. : 7,028,043 B2
APPLICATION NO. : 09/248736
DATED : April 11, 2006
INVENTOR(S) : Bleizeffer et al.

Page 1 of 1

It is certified that error appears in the above-identified patent and that said Letters Patent is hereby corrected as shown below:

Column 10, line 60, "specifics" should read --specifics--;

Column 13, line 50, "seep" shodul read --step--.

Column 15, line 48, "compute" should read --computer--.

Column 16, line 33, "articlee" should read --article--.

This certificate supersedes Certificate of Correction issued August 1, 2006.

Signed and Sealed this

Seventh Day of November, 2006

JON W. DUDAS
*Director of the United States Patent and Trademark Office*